(12) United States Patent
Bhamri et al.

(10) Patent No.: US 11,910,425 B2
(45) Date of Patent: Feb. 20, 2024

(54) USER EQUIPMENT AND BASE STATION INVOLVED IN THE TRANSMISSION OF DATA

(71) Applicant: Panasonic Intellectual Property Corporation of America, Torrance, CA (US)

(72) Inventors: Ankit Bhamri, Rödermark (DE); Hidetoshi Suzuki, Kanagawa (JP); Hongchao Li, Langen (DE); Tetsuya Yamamoto, Kanagawa (JP); Quan Kuang, Langen (DE); Rikin Shah, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 215 days.

(21) Appl. No.: 17/093,163

(22) Filed: Nov. 9, 2020

(65) Prior Publication Data

US 2021/0084664 A1   Mar. 18, 2021

Related U.S. Application Data

(63) Continuation of application No. PCT/EP2019/067980, filed on Jul. 4, 2019.

(30) Foreign Application Priority Data

Sep. 27, 2018 (EP) .................................... 18197388

(51) Int. Cl.
*H04W 72/08*     (2009.01)
*H04L 5/00*      (2006.01)
(Continued)

(52) U.S. Cl.
CPC ............. *H04W 72/542* (2023.01); *H04L 1/08* (2013.01); *H04L 5/0048* (2013.01); *H04L 5/0057* (2013.01)

(58) Field of Classification Search
None
See application file for complete search history.

(56) References Cited

U.S. PATENT DOCUMENTS 9,830,816 B1 *  11/2017  Murray .................. H04B 17/12
2004/0137896 A1 *  7/2004  Sarkar .................. H04L 1/1812
                                                        455/423

(Continued)

FOREIGN PATENT DOCUMENTS

CN      104641573 A    5/2015
EP      2 159 930 A1   3/2010
(Continued)

OTHER PUBLICATIONS

3GPP TR 38.801 V14.0.0, "3rd Generation Partnership Project; Technical Specification Group Radio Access Network; Study on new radio access technology; Radio access architecture and interfaces (Release 14)," Mar. 2017, 91 pages.
(Continued)

*Primary Examiner* — Steve R Young
(74) *Attorney, Agent, or Firm* — Seed IP Law Group LLP

(57) ABSTRACT

The present disclosure relates to a user equipment (UE) which comprises a transmitter, which transmits a signal to a base station over a channel, wherein the signal is transmitted based on an initial channel quality information indicating a first channel quality of the channel. A receiver of the UE receives a transmission quality information indicating a second channel quality of the channel used for transmitting the signal. A processing circuitry of the UE estimates a transmission quality based on the initial channel quality information and the transmission quality information,
(Continued)

wherein the transmission quality indicates whether the transmission of the signal over the channel was successful or not.

13 Claims, 17 Drawing Sheets

(51) Int. Cl.
  *H04L 1/08* (2006.01)
  *H04W 72/542* (2023.01)

(56) References Cited

U.S. PATENT DOCUMENTS

| | | | |
|---|---|---|---|
| 2009/0046650 A1* | 2/2009 | Dalsgaard | H04L 1/1812 370/329 |
| 2010/0188969 A1* | 7/2010 | Kim | H04W 72/1284 370/216 |
| 2013/0040684 A1* | 2/2013 | Yu | H04L 5/0048 455/517 |
| 2014/0079149 A1 | 3/2014 | Lee et al. | |
| 2015/0237572 A1* | 8/2015 | Kim | H04W 48/20 370/329 |
| 2016/0278072 A1* | 9/2016 | Palle | H04W 72/10 |
| 2017/0055248 A1* | 2/2017 | Moon | H04L 1/1812 |
| 2017/0118771 A1* | 4/2017 | Kazmi | H04W 74/0808 |
| 2018/0131477 A1 | 5/2018 | Kim et al. | |
| 2019/0393988 A1* | 12/2019 | Bae | H04L 1/1893 |

FOREIGN PATENT DOCUMENTS

| | | |
|---|---|---|
| EP | 1 999 878 B1 | 10/2016 |
| JP | 2018509837 A | 4/2018 |
| WO | 03/096567 A1 | 11/2003 |
| WO | WO 2017167198 A1 | 10/2017 |
| WO | WO 2018012259 A1 | 1/2018 |

OTHER PUBLICATIONS

3GPP TR 38.804 V14.0.0, "3rd Generation Partnership Project; Technical Specification Group Radio Access Network; Study on New Radio Access Technology; Radio Interface Protocol Aspects (Release 14)," Mar. 2017, 57 pages.
3GPP TR 38.913 V15.0.0, "3rd Generation Partnership Project; Technical Specification Group Radio Access Network; Study on Scenarios and Requirements for Next Generation Access Technologies; (Release 15)," Jun. 2018, 39 pages.
3GPP TS 36.212 V14.3.0, "3rd Generation Partnership Project; Technical Specification Group Radio Access Network; Evolved Universal Terrestrial Radio Access (E-UTRA); Multiplexing and channel coding (Release 14)," Jun. 2017, 198 pages.
3GPP TS 38.211 V15.2.0, "3rd Generation Partnership Project; Technical Specification Group Radio Access Network; NR; Physical channels and modulation (Release 15)," Jun. 2018, 96 pages.
3GPP TS 38.212 V15.2.0, "$3^{rd}$ Generation Partnership Project; Technical Specification Group Radio Access Network; NR; Multiplexing and channel coding (Release 15)," Jun. 2018, 98 pages.
3GPP TS 38.214 V15.2.0, "$3^{rd}$ Generation Partnership Project; Technical Specification Group Radio Access Network; NR; Physical layer procedures for data (Release 15)," Jun. 2018, 94 pages.
3GPP TS 38.300 V15.2.0, "$3^{rd}$ Generation Partnership Project; Technical Specification Group Radio Access Network; NR; NR and NG-RAN Overall Description; Stage 2 (Release 15)," Jun. 2018, 87 pages.
3GPP TS 38.321 V15.2.0, "$3^{rd}$ Generation Partnership Project; Technical Specification Group Radio Access Network; NR; Medium Access Control (MAC) protocol specification (Release 15)," Jun. 2018, 73 pages.
Extended European Search Report, dated Mar. 20, 2019, for European Application No. 18197388.4, 5 pages.
International Search Report, dated Oct. 17, 2019, for International Application No. PCT/EP2019/067980, 3 pages.
NTT Docomo, Inc., "Revised WID on New Radio Access Technology," RP-171485, Agenda Item: 9.2.1, 3GPP TSG RAN Meeting #75, West Palm Beach, USA, Jun. 5-8, 2017, 11 pages.
Sesia et al., "LTE: The UMTS Long Term Evolution," Second Edition, Sections 8.2, 9.3.5, 11.2.2.2 and 29.1.1, 28 pages.
Office Action, dated Nov. 18, 2022, for Indian Patent Application No. 202047056233. (6 pages).
English Translation of Japanese Office Action, dated Mar. 28, 2023, for Japanese Patent Application No. 2020-568418. (10 pages).
English Translation of Chinese Office Action dated Aug. 3, 2023, for the corresponding Chinese Patent Application No. 201980039961.4, 15 pages.

\* cited by examiner

- Comb 1 x 2 Cyclic Shifts : CDM Group 0
- Comb 2 x 2 Cyclic Shifts : CDM Group 1
- Control
- Data

- Comb 1 x 2 Cyclic Shifts x 2 TD-OCC : CDM Group 0
- Comb 2 x 2 Cyclic Shifts x 2 TD-OCC : CDM Group 1
- Control
- Data

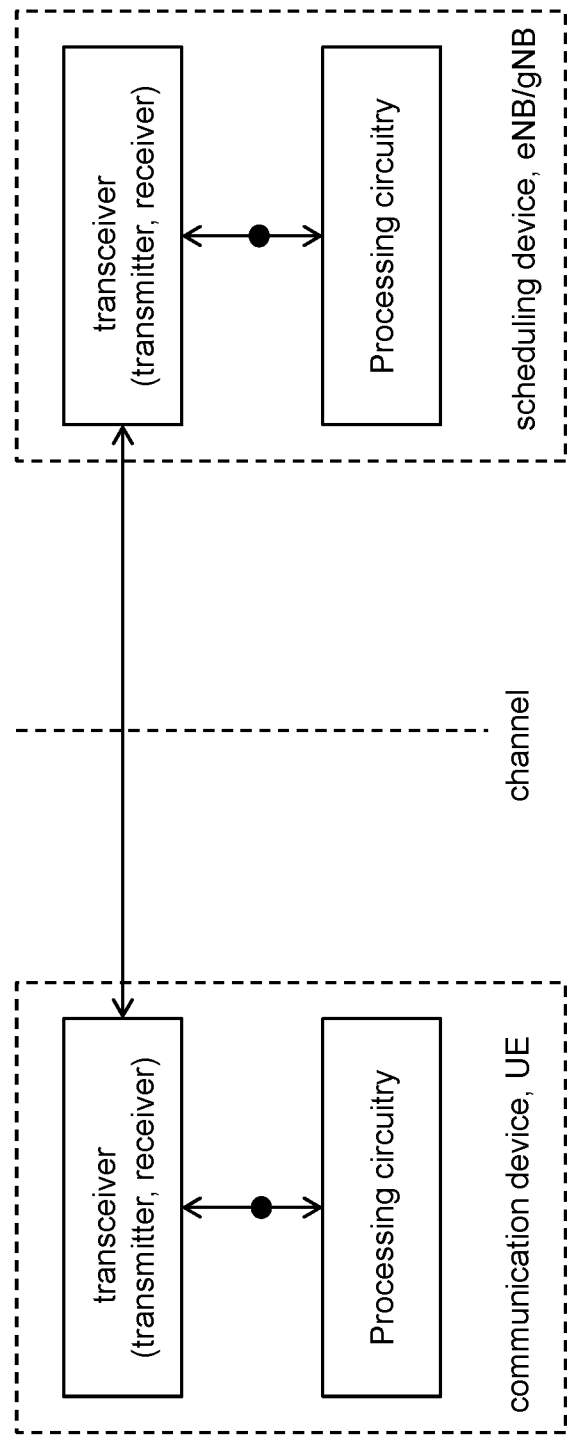

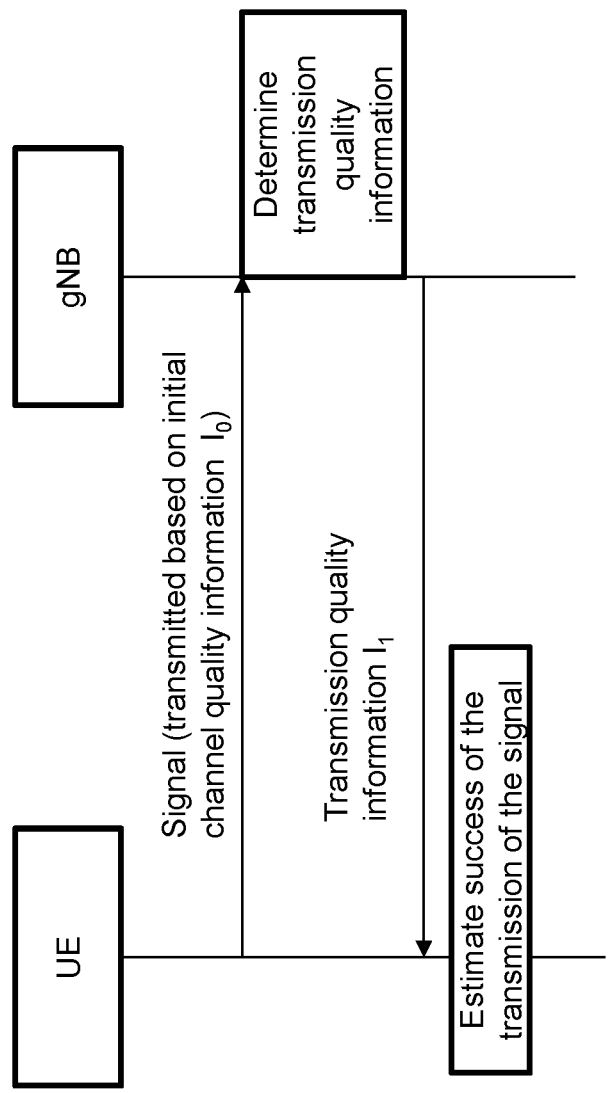

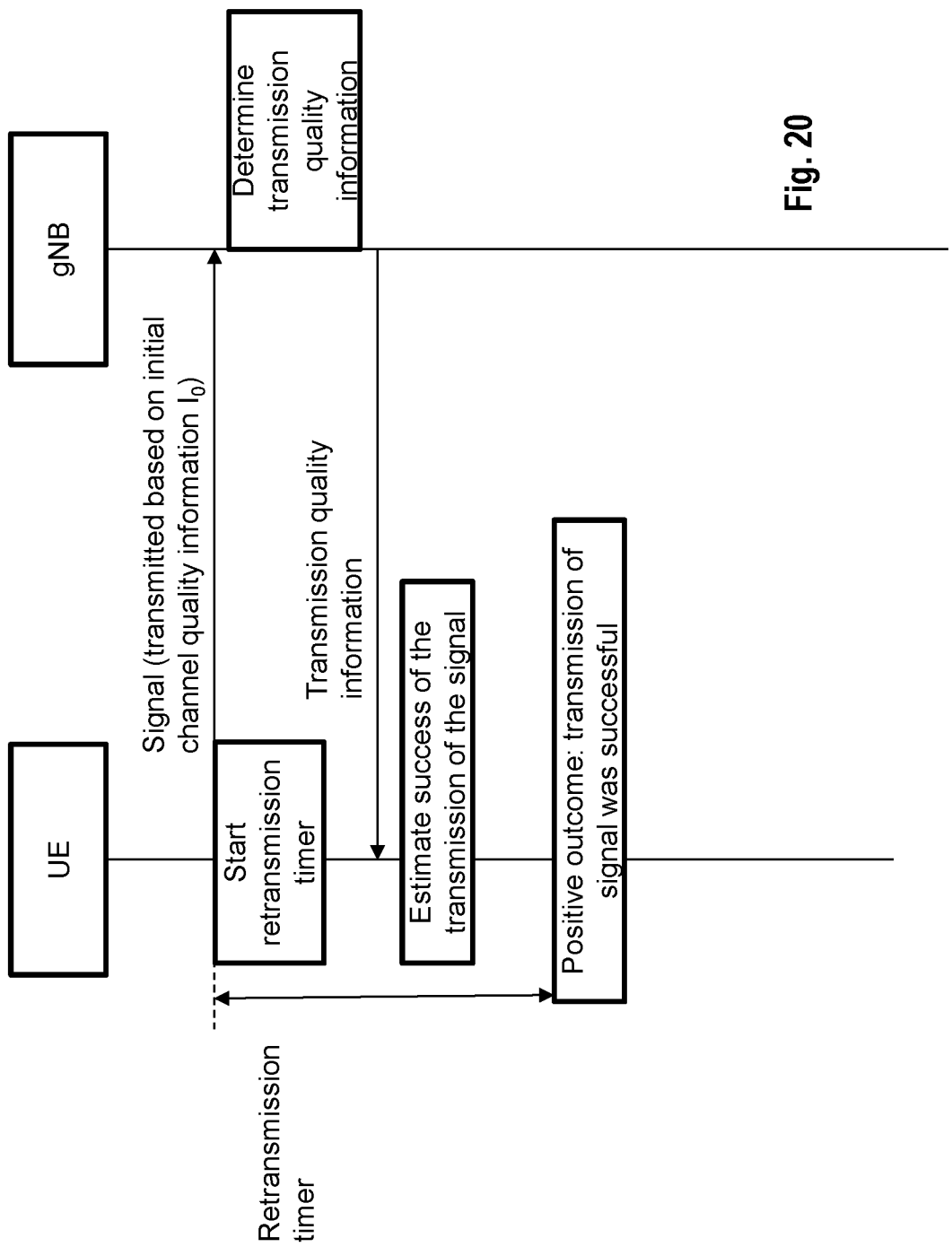

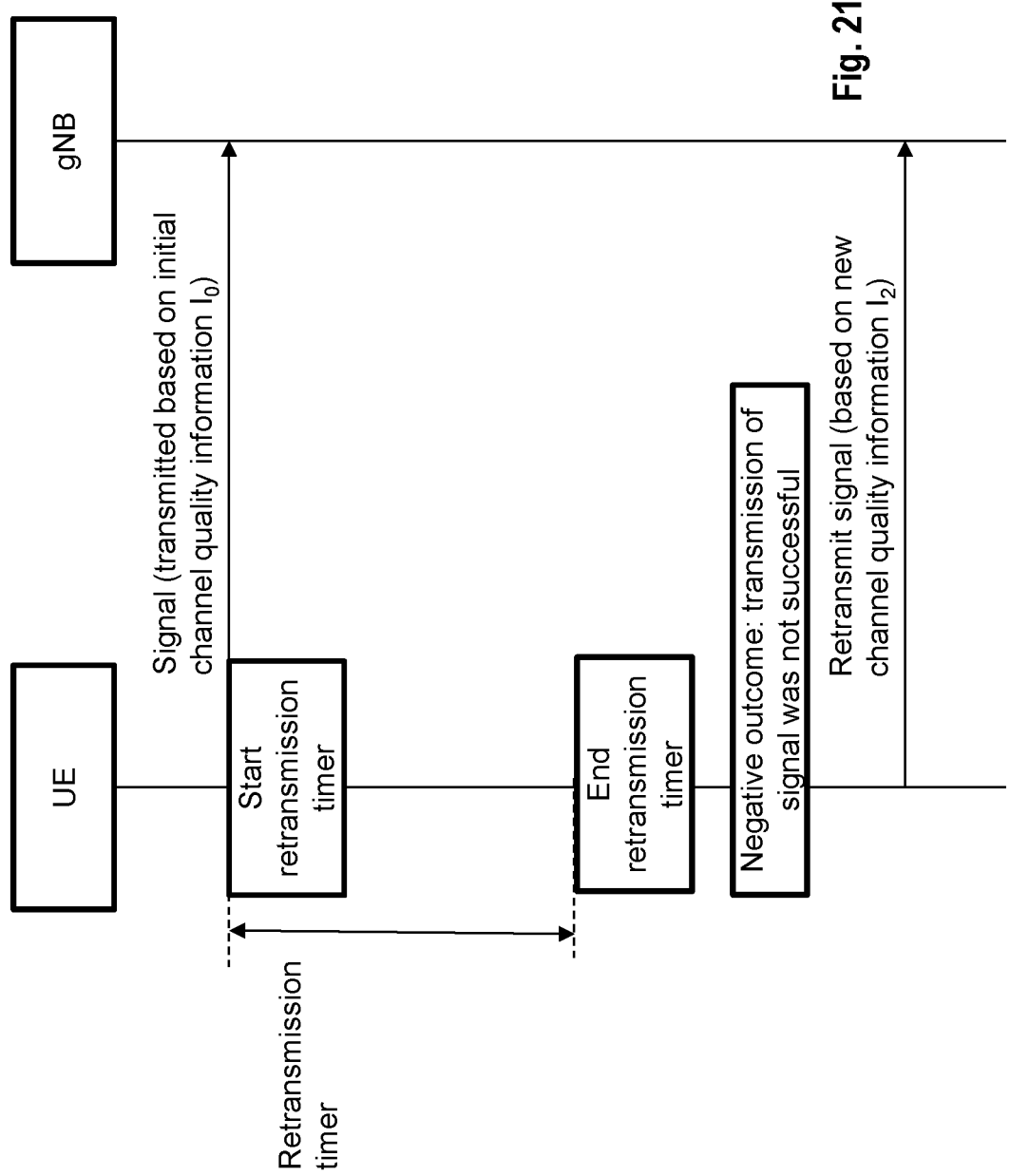

USER EQUIPMENT AND BASE STATION INVOLVED IN THE TRANSMISSION OF DATA

BACKGROUND

Technical Field

The present disclosure is directed to methods, devices and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0 incorporated herein by reference), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

SUMMARY

Non-limiting and exemplary embodiments facilitate providing improved procedures to transmit data.

In one general first aspect, the techniques disclosed here feature a user equipment comprising a receiver, transmitter and processing circuitry according to the following. The transmitter transmits a signal to a base station over a channel, wherein the signal is transmitted based on an initial channel quality information indicating a first channel quality of the channel. The receiver receives a transmission quality information indicating a second channel quality of the channel used for transmitting the signal. The processing circuitry estimates a transmission quality based on the initial channel quality information and the transmission quality information, wherein the transmission quality indicates whether the transmission of the signal over the channel was successful or not.

In one general first example, the techniques disclosed here feature a method comprising the following steps performed by a user equipment. The steps include:
transmitting a signal to a base station over a channel, wherein the signal is transmitted based on an initial channel quality information indicating a first channel quality of the channel,
receiving a transmission quality information indicating a second channel quality of the channel used for transmitting the signal,
estimating a transmission quality based on the initial channel quality information and the transmission quality information, wherein the transmission quality indicates the whether the transmission of the signal over the channel was successful or not.

In one general first example, the techniques disclosed here feature a serving base station comprising a receiver and processing circuitry as well as a transmitter according to the following. The receiver receives at least a part of a signal from a user equipment over a channel, wherein the signal is transmitted based on an initial channel quality information indicating a first channel quality of the channel. The processing circuitry determines during processing the received signal a transmission quality information indicating a second channel quality of the channel used for receiving the signal. The transmitter transmits the transmission quality information upon determining the transmission quality information.

In one general first example, the techniques disclosed here feature a method comprising the following steps performed by a base station. The steps include:
receiving at least a part of a signal from a user equipment over a channel, wherein the signal is transmitted based on an initial channel quality information indicating a first channel quality of the channel,
determining during processing the received signal a transmission quality information indicating a second channel quality of the channel used for receiving the signal,
transmitting the transmission quality information upon determining the transmission quality information.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIG. 7 illustrates the exemplary and simplified structure of a UE and a gNB;

FIG. 8 illustrates an exemplary signal communication between the UE and the base station;

FIG. 20 illustrates another exemplary signal communication between the UE and the base station, according to another exemplary implementation; and FIG. 21 illustrates another exemplary signal communication between the UE and the base station, according to another exemplary implementation.

DETAILED DESCRIPTION

5G NR System Architecture and Protocol Stacks

As presented in the background section, 3GPP is working at the next release for the 5th generation cellular technology, simply called 5G, including the development of a new radio access technology (NR) operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology." Results and agreements are collected in the Technical Report TR 38.804 v14.0.0, incorporated herein in its entirety by reference.

Figure 1:
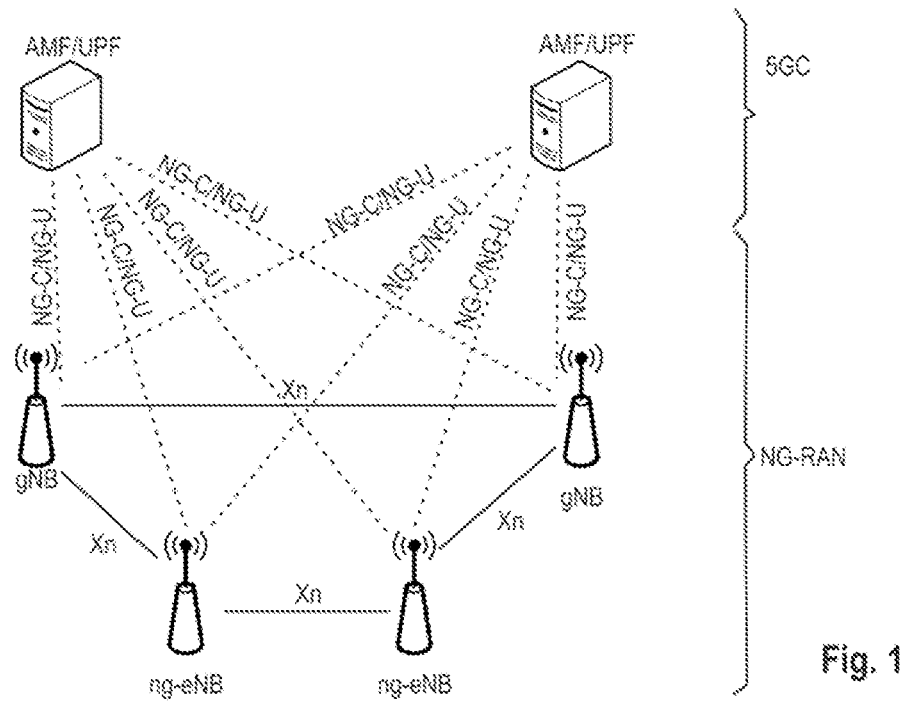
FIG. 1 shows an exemplary architecture for a 3GPP NR system.

Among other things, the overall system architecture assumes an NG-RAN (Next Generation-Radio Access Network) that comprises of gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.2.0, section 4 incorporated herein by reference).

Figure 2:
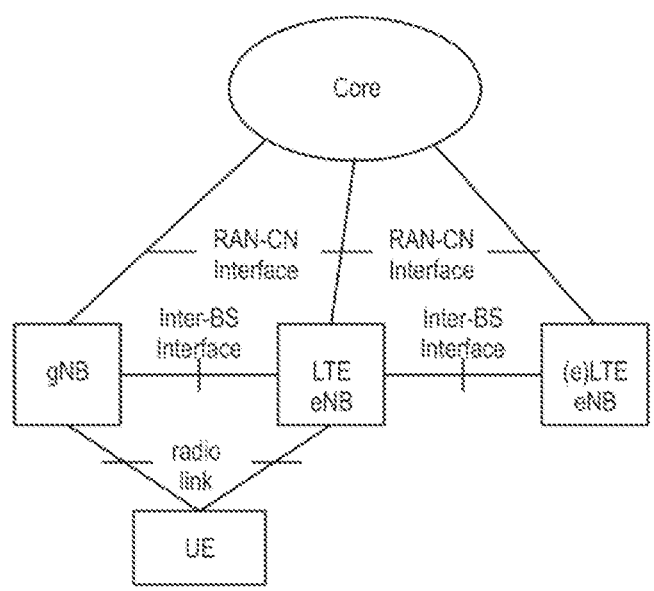
FIG. 2 shows an exemplary user and control plane architecture for the LTE eNB, gNB, and UE.

Various different deployment scenarios can be supported (see, e.g., 3GPP TR 38.801 v14.0.0 incorporated herein by reference). For instance, a non-centralized deployment scenario (see, e.g., section 5.2 of TR 38.801; a centralized deployment is illustrated in section 5.4) is presented therein, where base stations supporting the 5G NR can be deployed. FIG. 2 illustrates an exemplary non-centralized deployment scenario (see, e.g., FIG. 5.2.-1 of said TR 38.801), while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see, e.g., 3GPP TS 38.300 v15.2.0, section 4.4.1 incorporated herein by reference) comprises the PDCP (Packet Data Convergence Protocol), RLC (Radio Link Control) and MAC (Medium Access Control) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300 version 15.2.0 incorporated herein by reference). For more information on the control plane protocol stack for NR, see for instance TS 38.300, section 4.4.2. An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300. The mentioned sections of TS 38.300 are incorporated herein by reference.

The new NR layers exemplarily assumed for the 5G systems may be based on the user plane layer structure currently used in LTE(-A) communication systems.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km2 in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. For more information, see for instance TS 38.321, section 4.4, which is incorporated herein by reference.

The symbol duration Tu and the subcarrier spacing $\Delta f$ are directly related through the formula $\Delta f = 1/Tu$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain. Some definitions have already been achieved as apparent from 3GPP TS 38.211 v15.2.0 incorporated herein by reference.

Scheduling

Generally, the new radio system 5G-NR is essentially a scheduled system, implying that the scheduler determines when and to which devices the time, frequency, and spatial resources should be assigned and what transmission parameters, e.g., data rate, to use. Scheduling can be dynamic or semi-static.

One of the principles in the new radio system 5G-NR is shared-channel transmission where time-frequency resources are dynamically shared between users. The scheduler is part of the MAC layer at the gNB (also may be viewed as a separate entity) and controls the assignment of the uplink and downlink resources in terms of so-called resource blocks in the frequency domain and OFDM symbols and slot in the time domain.

One operation of the scheduler is dynamic scheduling, where the gNB takes a scheduling decision, typically once per slot, and sends scheduling information to the selected set of devices.

For example, the scheduling information determines which devices are to transmit and receive. Since scheduling decisions are taken frequently, it is possible to follow rapid variations in the traffic demand and radio channel quality, say by efficiently exploiting the available resources. Dynamic scheduling is flexible and can adapt to rapid variations in the traffic behavior, but requires associated control signaling.

Additionally, the new radio system 5G-NR supports transmission schemes that are not reliant on dynamic grants. Such a transmission without a dynamic grant is also referred to as the semi-static scheduling or transmission with configured grant. Scheduling without a dynamic grant implies that the transmission parameters are provided to the device in advance and not on a dynamic basis. Some definitions, that are provided, have already been achieved as apparent from 3GPP TS 38.214 v15.2.0 incorporated herein by reference.

When resource allocation is semi-statically configured by a higher layer parameter, higher layer parameters are applied in the transmission (see for example detailed discussed in section 6.1.2.3 of 3GPP TS 38.214 v15.2.0), The possibility for transmission/reception without a dynamic grant may reduce the control signaling overhead. Some definitions have already been achieved as apparent from 3GPP TS 38.321 v15.2.0 incorporated herein by reference.

The details for transmission and reception without dynamic scheduling may differ between the downlink and uplink (see for example section 5.8 of 3GPP TS 38.321 v15.2.0).

For example, in the downlink, a scheme similar to semi-persistent scheduling (SPS) in LTE is used. A semi-static scheduling pattern is signaled in advance to the device. Upon activation by L1/L2 control signaling, which also includes parameters such as the time-frequency resources and the coding and modulation scheme (MCS) to use, the device receives downlink data transmissions according to the preconfigured pattern.

According to an implementation for the downlink, the semi-persistent scheduling is supported where the device is configured as a periodicity of the data transmissions using RRC signaling. Activation of semi-persistent scheduling is done using the Physical Downlink Control Channel (PDCCH) as for dynamic scaling but with the Configured Scheduling Radio Network Temporary Identifier (CS-RNTI) instead of the Cell Radio Network Temporary Identifier (C-RNTI). The PDCCH also carries the necessary information in terms of time-frequency resources and other parameters needed in a similar way as dynamic scheduling.

The hybrid-ARQ (HARQ) process number is derived from the time when the downlink data transmission starts according to the formula. Upon activation of semi-persistent scheduling, the device receives a downlink data transmission periodically according to the RRC-configured periodicity using sentences parameters indicated on the PDCCH activating the transmission. Hence, control signaling is only used once and the overhead is saved.

After enabling semi-persistent scheduling, the device continues to monitor as a set of candidate PDCCHs for uplink and downlink scheduling comments. This is useful in case that there are conditional transmissions of large amounts of data from which the seeming persistence allocation is not sufficient. It is also used to handling HARQ retransmissions which are dynamically scheduled.

In the configured grant in uplink, there are to slightly different schemes, which types are referred to as type 1 and type 2, differing on how to activate the scheme. In type 1, RRC configures all parameters (are parameters are provided by the RRC), including the time-frequency resources and the MCS to use, and also activates the uplink transmission according to the parameters. Type 2, on the other hand, is similar to SPS scheduling where the RRC configures the scheduling pattern in time. Activation is done using a L1/L2 signaling (similar to the downlink case), which includes necessary time parameters (except periodicity which is provided through RRC signaling). The benefits for both schemes are similar, namely for example reviews control signaling overhead and, to some extent, to reduce the latency before uplink data transmission is no scheduling request-grant cycle is needed prior to data transmission.

According to one implementation, type 1 sets all transmission parameters, including periodicity, time of the, and frequency resources as low as modulation and coding scheme of possible uplink transmissions, using RRC signaling. Upon receiving the RRC configuration, the device can start to use the configured ground for transmission in the time and stand given by the periodicity and offset.

According to a further implementation, type 2 is similar to downlink semi-persistent scheduling. RRC signaling is used to configure the periodicity, why the transmission parameters are provided as part of the activation using the PDCCH. Upon receiving the activation, the device transmits according to the preconfigured periodicity if, for example, there are data in the buffer According to a further implementation, the device requests for retransmission it acknowledged receiving the activation/deactivation of the configured font type II by sending a Mac control element in the uplink According to an implementation for the uplink, two sheets for transmission without a dynamic grant supported, differing in the race they are activated Control Signaling/PDCCH/DCI/Search Spaces To support the transmission of downlink and uplink transport channels, the associated control signaling may be defined. This control signaling is often referred to as L1/L2 control signaling, indicating that the corresponding information partly originates form the physical layer (layer 1) and partly from MAC (layer 2).

In the following, the basic principles for downlink control signaling, including scheduling grants and assignments are described.

figurations in LTE can be found in section 29.1.1 of S. Sesia, I. Toufik and M, Baker, LTE: The UMTS Long Term Evolution, Second Edition, incorporated herein by reference.

The table of layer-to port mapping in current LTE (see, e.g., 3GPP TS 36.212, V14.3.0; Table 5.3.3.1.5C-2) is shown in the following Table 1:

TABLE 1

Antenna port(s), scrambling identity (SCID) and number of layers indication

| L | | Two Codewords: Codeword 0 enabled, Codeword 1 enabled | |
|---|---|---|---|
| Value | Message | Value | Message |
| 0 | 1 layer, port 7, $n_{SCID} = 0$ (OCC = 2)L | 0 | 2 layer, port 7-8, $n_{SCID} = 0$ (OCC = 2) |
| 1 | 1 layer, port 7, $n_{SCID} = 1$ (OCC = 2) | 1 | 2 layer, port 7-8, $n_{SCID} = 1$ (OCC = 2) |
| 2 | 1 layer, port 8, $n_{SCID} = 0$ (OCC = 2) | 2 | 2 layer, port 7-8, $n_{SCID} = 0$ (OCC = 4) |
| 3 | 1 layer, port 8, $n_{SCID} = 1$ (OCC = 2) | 3 | 2 layer, port 7-8, $n_{SCID} = 1$ (OCC = 4) |
| 4 | 1 layer, port 7, $n_{SCID} = 0$ (OCC = 4) | 4 | 2 layer, port 11, 13, $n_{SCID} = 0$ (OCC = 4) |
| 5 | 1 layer, port 7, $n_{SCID} = 1$ (OCC = 4) | 5 | 2 layer, port 11, 13, $n_{SCID} = 1$ (OCC = 4) |
| 6 | 1 layer, port 8, $n_{SCID} = 0$ (OCC = 4) | 6 | 3 layer, port 7-9 |
| 7 | 1 layer, port 8, $n_{SCID} = 1$ (OCC = 4) | 7 | 4 layer, port 7-10 |
| 8 | 1 layer, port 11, $n_{SCID} = 0$ (OCC = 4) | 8 | 5 layer, port 7-11 |
| 9 | 1 layer, port 11, $n_{SCID} = 1$ (OCC = 4) | 9 | 6 layer, port 7-12 |
| 10 | 1 layer, port 13, $n_{SCID} = 0$ (OCC = 4) | 10 | 7 layers, ports 7-13 |
| 11 | 1 layer, port 13, $n_{SCID} = 1$ (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

In new radio system 5G-NR, there is only a single control channel, the physical downlink control channel (PDCCH). On a high level, the principles of the PDCCH processing in 5G-NR are similar to LTE. For instance, the main purpose of DCI (Downlink Control Information) in 5G NR is the same as DCI in LTE, namely being a special set of information that schedules a downlink data channel (e.g., the PDSCH) or an uplink data channel (e.g., PUSCH). In 5G NR there are a number of different DCI Formats defined already, as apparent from TS 38.212 v15.2.0 section 7.3.1 incorporated herein by reference. The following table is taken therefrom:

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

More detailed information on the different DCI formats can be obtained from the cited TS 38.212 v15.2.0.

LTE DMRS Configuration

The DMRS configurations in 3GPP NR described above are different from LTE, where there is a mainly a single configuration in downlink to support up to total 8 orthogonal ports/layers using code-division multiplexing in frequency and time using Walsh-Hadamard orthogonal cover codes. This configuration and further details on the DMRS con- In LTE, up to eight orthogonal DMRS ports for downlink are supported, which mainly use a single category of multiplexing scheme, i.e., OCC in time/frequency. Therefore, any of the port combinations could be used for mapping layers without impacting the performance for a given scenario. Furthermore, for a given number of layers, usage of resources (DMRS overhead) is the same for any port combination.

Moreover, LTE provides limited support for MU-MIMO. Also, a fixed DMRS configuration is supported; hence, no additional signaling is required for dynamic configuration.

As can be seen from Table 1, there are very limited combinations allowed for layer-to-port mappings in LTE. A length 4 bitmap is defined to signal the layer-to-port mapping for a given user. A minimum number of port combinations are supported for layer-to-port mapping results from the following restrictions: For up to two layers, port-indexing for the mapping is consecutive and non-overlapping. For three to eight layers, the indexing is consecutive, non-overlapping, and starting from index 0 as a fixed start point. The mapping is limited to one port combination.

In the latest release of LTE only transparent MU-MIMO (and no non-transparent MU-MIMO) is supported. However, this was not always the case. In LTE Rel-8, when MU-MIMO was introduced for the first time to support transmission up to 2 UEs, non-transparent MU-MIMO was introduced by having a 1-bit dedicated power offset field. Yet, support for non-transparent MU-MIMO for more than two UEs was never agreed, particularly not in the later releases of LTE. The drawback of an increased signaling overhead was decided not to outweigh the benefits resulting therefrom.

DMRS Requirements for NR

In $3^{rd}$ generation partnership project new radio (3GPP NR), reference signals are re-designed to meet the wide range of requirements and use cases. Demodulation reference signals (DMRS) that are used for the purpose of channel estimation are also being designed to have a uniform structure for both uplink and downlink with cyclic-prefix orthogonal frequency division multiplexing (CP-OFDM) waveform. It has already been agreed in that two configurations (with different multiplexing schemes for orthogonal DMRS ports) of front-loaded DMRS will be supported and each configuration with flexibility of using 1-symbol or 2-symbol DMRS.

In current LTE, there is a fixed configuration with single category of multiplexing scheme for orthogonal DMRS ports and no support for non-transparent MU-MIO.

However, in 3GPP NR, the situation is more complex due to the possibility of more interference from co-scheduled DMRS ports for other UEs. In addition, rate matching is necessary due to frequency division multiplexing (FDM) between different DMRS ports. Based on this, it is expected to support UE non-transparent MU-MIMO in NR. In this disclosure, we provide a framework to indicate at least some information about the co-scheduled DMRS ports within same and/or different CDM groups in MU-MIMO by adding new fields to the DMRS layer-to-port mapping table.

This disclosure relates to NR technology. For the work item on NR access technology in Release 15, see 3GPP TSG RAN Meeting #75, RP-171485 by NTT DoCoMo, "Revised WID on New Radio Access Technology," Jun. 5-8, 2017). More specifically, it deals with the aspects of front-loaded DMRS for both downlink and uplink with CP-OFDM waveform. In chairman notes from RAN1 NR #3 (RAN1 Chairman Notes: RAN1 NR Ad-Hoc #3, incorporated herein by reference), all the latest agreements related to DMRS are captured and this disclosure deals with some of the aspects that are not yet discussed or are left for further discussion. The disclosure provides a framework for signaling of at least some information related to co-scheduled DMRS ports by using DMRS layer-to-port mapping table.

As mentioned, in 3GPP NR, Demodulation Reference Signals (DMRS) are re-designed for both downlink and uplink.

Two configurations may be supported for front-loaded DMRS in downlink and uplink with CP-OFDM waveform, which are illustrated in FIGS. 3 to 6.

As shown therein, the front-loaded reference signals are allocated to resources of the first data symbol adjacent to resources for the signaling section (the signaling section consisting of, e.g., two symbols) of a TTI if one-symbol DMRS are used and to resources of the first two data symbols if two-symbol DMRS are used.

FIGS. 3 to 6 each show an exemplary resource grid corresponding to a slot of 14 symbols and 12 subcarriers. The first two symbols on the left of each of the figures correspond to the signaling section of a slot. The physical downlink control channel (PDCCH) is signaled in the signaling section. In LTE, this exemplary resource grid would correspond to one of two slots of a subframe. However, this shall not limit the present disclosure since a subframe may also correspond to a (single) slot or include more than two slots; and the slot may also have more or less than 14 symbols and 12 subcarriers.

Figure 3:
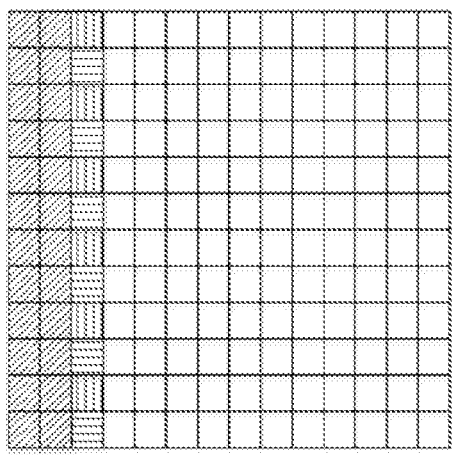
FIGS. 3 to 6 are schematic drawings of front loaded demodulation reference signal (DMRS) configuration types.
Figure 4:
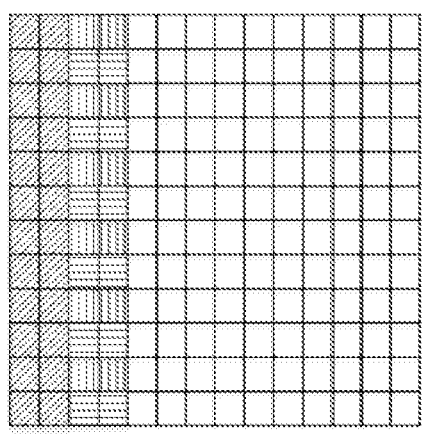

The first front-loaded DMRS configuration corresponding to configuration type 1 is shown in FIGS. 3 and 4. This configuration is aimed at supporting up to eight orthogonal DMRS ports for Single-User Multiple Input Multiple Output (SU-MIMO) or Multi-User Multiple Input Multiple Output (MU-MIMO). The first configuration supports up to four orthogonal DMRS ports if one symbol DMRS are used, as shown in FIG. 3. In particular, two combs and two cyclic shifts (CS) may be combined to form up to four component sets, and the respective resulting component sets can be respectively assigned to up to four DMRS ports. These component sets are in the context of the present disclosure also referred to as CDM groups.

Figure 5:
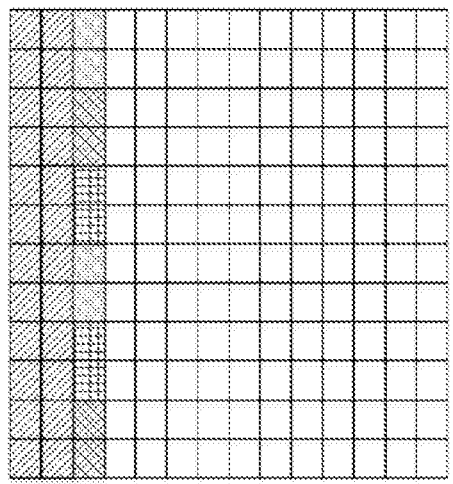
Figure 6:
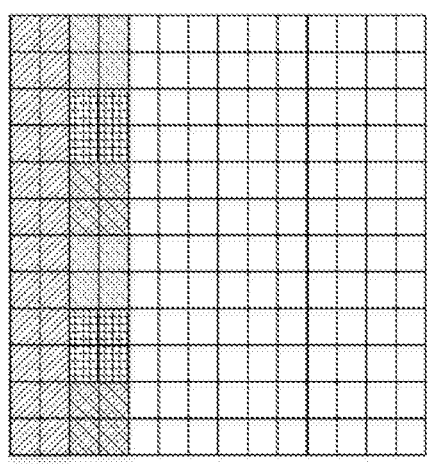

If two symbol DMRS are used, as shown in FIG. 4, the two combs and two cyclic shifts may further be combined with two time division Orthogonal Cover Codes (TD-OCC) in particular Walsh-Hadamard TD-OCCs, ({1,1} and {1,−1}), and up to eight orthogonal DMRS ports may be supported. However, in the two-symbol DMRS case it should also be possible to schedule up to 4 DMRS ports without using both {1,1} and {1,−1}. The second front-loaded DMRS configuration corresponding to configuration type 2 is shown in FIGS. 5 and 6. This configuration provides support for up to twelve orthogonal ports for SU-MIMO or MU-MIMO. In particular, two (Walsh-Hadamard) frequency division Orthogonal Cover Codes (FD-OCC) respectively applied across adjacent REs (resource elements) in the frequency domain yield six component sets or CDM groups.

As can be seen from FIGS. 5 and 6, with twelve subcarriers, pairs of adjacent REs are grouped into three Frequency Division Multiplexing (FDM) groups. Accordingly, the six component sets result from two FD-OCCs (both {1,1} and {1,−1}) applied respectively to the three FDM groups. In the case of one symbol DMRS (FIG. 5), the resulting six respective component sets can be assigned to up to six orthogonal DMRS ports. In the case of two-symbol DMRS, these six component sets may further be combined with two TD-OCCs resulting in a capability to support up to twelve orthogonal DMRS ports (FIG. 6).

As described above with reference to FIGS. 3 to 6, combs, cyclic shifts, FD-OCCs, FDMs, and TD-OCCs constitute resource components for reference signals, in particular front-loaded DMRS.

These resource components are combined in accordance with the first or the second front-loaded DMRS configuration, and the resulting component sets or CDM groups are respectively assigned to orthogonal DMRS ports. However, usage of two-symbol DMRS should be possible even for lower ranks. Not all component sets or CDM groups that are supported by a particular configuration in the one-symbol or two symbol DMRS case need to be used for assignment of a port. In particular, also in the two-symbol case it should be possible to schedule up to 6 DMRS ports without using both {1,1} and {1,−1}.

From a user equipment (UE) perspective, DMRS ports multiplexed by frequency domain code division multiplexing (CDM) are quasi co-located.

It is still open for further study whether the front-load DMRS configuration type for a UE for UL and DL can be different or not. Moreover, if there are significant complexity/performance issues involved in the above agreements, down-selection can still be discussed.

The restrictions to the layer-to-port mapping of LTE are no longer acceptable in 3GPP NR. Particularly, there is a demand for non-transparent MU-MIMO to benefit from the advantages of a new system design in 3GPP NR.

For example, for incorporating the support of non-transparent MU-MIMO into 3GPP NR, it would be possible to revisit the decision taken for LTE of not incorporating dedicated bit fields. However, also under current considerations, since there exists a dedicate bit field for MU-MIMO, the support is not necessary.

The four main reference signals are the demodulation reference signal (DMRS), phase-tracking reference signal (PTRS), sounding reference signal (SRS) and channel-state information reference signal (CSI-RS) (see for instance TS 38.211, sections 6.4.1 and 7.4.1, which are incorporated herein by reference).

DMRS is used to estimate the radio channel for demodulation. DMRS is UE-specific, can be beamformed, confined in a scheduled resource, and transmitted only when necessary, both in DL and UL. To support multiple-layer MIMO transmission, multiple orthogonal DMRS ports can be scheduled, one for each layer. Orthogonality is achieved by FDM (comb structure) and TDM and CDM (with cyclic shift of the base sequence or orthogonal cover codes). The basic DMRS pattern is front loaded, as the DMRS design takes into account the early decoding requirement to support low-latency applications. For low-speed scenarios, DMRS uses low density in the time domain. However, for high-speed scenarios, the time density of DMRS is increased to track fast changes in the radio channel.

PTRS is introduced in NR to enable compensation of oscillator phase noise. Typically, phase noise increases as a function of oscillator carrier frequency. PTRS can therefore be utilized at high carrier frequencies (such as mmWave) to mitigate phase noise. One of the main degradations caused by phase noise in an OFDM signal is an identical phase rotation of all the subcarriers, known as common phase error (CPE). PTRS is designed so that it has low density in the frequency domain and high density in the time domain, since the phase rotation produced by CPE is identical for all subcarriers within an OFDM symbol, but there is low correlation of phase noise across OFDM symbols. PTRS is UE-specific, confined in a scheduled resource and can be beamformed. The number of PTRS ports can be lower than the total number of ports, and orthogonality between PTRS ports is achieved by means of FDM. PTRS is configurable depending on the quality of the oscillators, carrier frequency, OFDM subcarrier spacing, and modulation and coding schemes used for transmission.

The SRS is transmitted in UL to perform CSI measurements mainly for scheduling and link adaptation. For NR, it is expected that the SRS will also be utilized for reciprocity-based precoder design for massive MIMO and UL beam management. It is likely that the SRS will have a modular and flexible design to support different procedures and UE capabilities. The approach for CSI-RS is similar.

To enable uplink channel sounding a device may be configured for transmission of sounding reference signals (SRS).

Function of SRS in UL can be see similar to that of CSI-RS in DL, although the structure of SRS is quite different from CSI-RS. SRS is limited to a maximum of 4 antenna ports, while CSI-RS supports up to 32 antenna ports. Basically, SRS is designed to have a low-cubic metric enabling high device power-amplifier efficiency. According to one implementation, SRS spans 1, 2 or 4 consecutive OFDM symbols and is located somewhere within the last 6 symbols of the slot. In frequency domain, SRS is transmitted on every Nth subcarrier, where N can take values 2 or 5. For more information, see for instance TS 38.211, section 6.4.1.4, which is incorporated herein by reference.

HARQ

In case that NR operation is configured without a dynamic grant, according to one implementation, the device is configured with resources, for example in advance, that can be used for uplink data transmission (or downlink data reception). Once a device has data available it can immediately commence uplink transmission without going through the scheduling request-grant cycle, thereby enabling lower latency.

In order to increase reliability of the data reception (e.g., in case that that NR operation is configured without a dynamic grant), a feedback is transmitted to the device that data has been not successfully received. This feedback may be communicated upon determining that the received data has not been successfully received and a retransmission is required.

One primary way of handling retransmission in the radio system 5G-NR NR is the Hybrid automatic repeat-request (HARQ) protocol.

HARQ retransmission with incremental redundancy is used where the device reports the outcome of the decoding operation to the base station. In the case of erroneously received data, the base station can retransmit the data, and the device combines the soft information from multiple transmission attempts. However, retransmitting the whole transport block could in this case become inefficient. NR therefore supports retransmission on a finer granularity known as code-block group (CBG).

The concept of HARQ in NR is similar to LTE HARQ, but there is are differences in terms of the details. In LTE HARQ, downlink use an asynchronous mechanism, but uplink uses a synchronous mechanism. In contrast, in NR both downlink and uplink, an asynchronous mechanism is used. In asynchronous HARQ, the multiple HARQ processes are operated in any order. To keep track of each HARQ process even when they are not running in order, the sender and receiver in the HARQ process should know the exact HARQ process number for each transmission/reception of the HARQ data. For this, DCI carries the field called HARQ Process number. In LTE, only the DCI for downlink scheduling carries this field (since LTE DL use asynchronous HARQ) and the DCI for uplink scheduling does not carry this field. However, in NR, both downlink scheduling DCI (i.e., DCI 1_0, 1_1) and uplink scheduling DCI (i.e., DCI 0_0, 0_1) carry the field HARQ Process Number, since they both use asynchronous HARQ.

Although the above discussed retransmission increases the reliability, the inventors have recognized several problems in said connection. For instance, in case without a dynamic grant, the retransmission request may be conducted quite late, namely after completely processing a received signal. There is no request for retransmission before it is determined that the signal has not been successfully received.

Moreover, lost signals may reduce the reliability of the system. For instance, if the signal is not received by the gNB or the request for retransmission is not received by the UE, the reliability of the system suffers. In this respect, a positive feedback (e.g., ACK) would again increase reliability. However, this can result in an increased latency.

The inventors have recognized the need for defining a mechanism that facilitates a high reliability of the system and/or a low latency in the above described system for retransmission requests.

In the following, UEs, base stations, and procedures to meet these needs will be described for the new radio access technology envisioned for the 5G mobile communication systems. Different implementations and variants will be explained as well. The following disclosure was facilitated by the discussions and findings as described above and may for example be based at least on part thereof.

In general, it should be however noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers etc. used in the following are closely related to LTE/LTE-A systems or to terminology used in the current 3GPP 5G standardization, even though specific terminology to be used in the context of the new radio access technology for the next 3GPP 5G communication systems is not fully decided yet. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

FIG. 7 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as comparing, determining, deciding, calculating, measuring, etc. The transmitter may be responsible for performing the process of transmitting and other processes related thereto. The receiver may be responsible for performing the process of receiving and other processes related thereto, such as monitoring a channel.

In the present case, as will become apparent from the below disclosure of the different implementations and variants thereof, the processing circuitry can thus be exemplarily configured to at least partly perform the step of estimating a transmission quality, for instance by comparing information, e.g., comparing older and newer information relating to the quality of a channel used for communicating a signal. For example, the processing circuitry thus can estimate a transmission quality of a channel, e.g., determining that the transmission of a signal was reliable enough or not. The processing circuitry can also at least partly perform the step of operating a timer, e.g., starting, waiting, stopping same, and determining its expiry. Another task that can be performed at least partly by the processing circuitry is evaluating a feedback signal, such as ACK, NACKs, to determine whether a signal or data packet was successfully received at the receiving side or not.

The transmitter can be configured to be able to at least partly perform the step of transmitting signals and/or data packets.

The solutions offered in the following mainly apply to the new 5G NR standardization, particularly to the uplink transmissions without a dynamic grant but may also apply to other systems such as the SPS (semi-persistent scheduling) in LTE. Moreover, in the following the solutions are mainly presented in the context of communicating an outcome (feedback) in configured-grant scenarios, with an uplink grant provided in advance, e.g., by the RRC. This is however mainly to facilitate illustration and explanation of the solutions. Therefore, the solutions as explained in the following do not need to be used in configured-grant scenarios only, but can also be used in other scenarios without scheduled grants such as the LTE semi-persistent scheduling.

One exemplary communication between the UE and the gNB according to the above-explained principles is illustrated in FIG. 8. As illustrated therein, the UE communicates a signal to the base station. For example, the signal comprises at least one reference signal and/or a user data signal.

Figure 9:
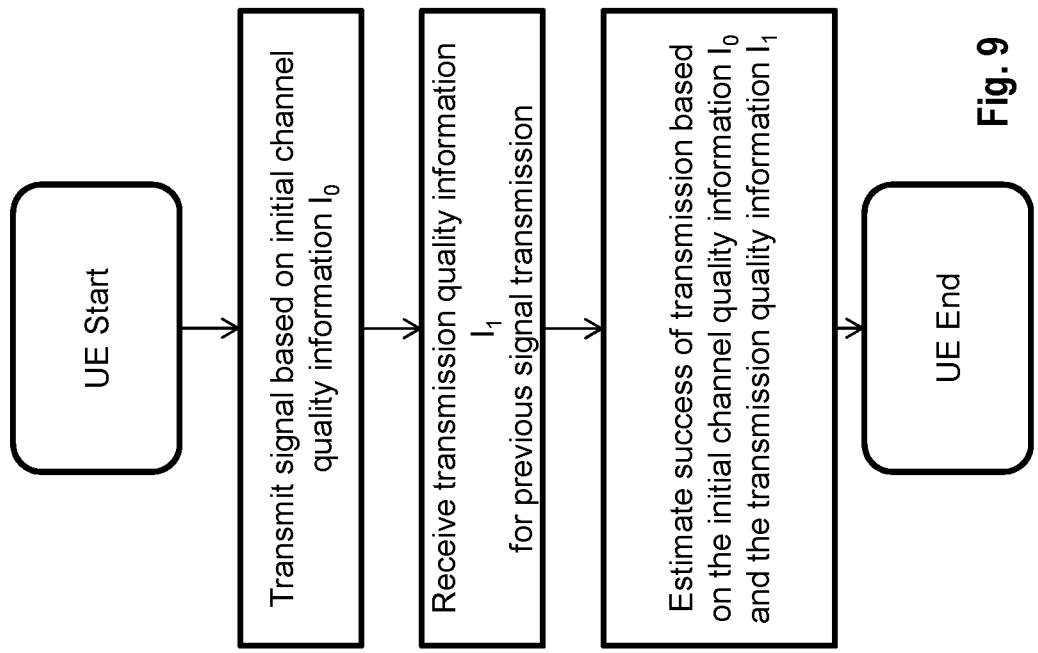
FIG. 9 is a flow diagram for the behavior of the UE, according to an exemplary implementation of an embodiment.

As further illustrated in FIG. 9, a flow diagram of the UE behavior according to an exemplary implementation of the above principles is illustrated, wherein the UE transmits the signal based on an initial channel quality information $I_0$ to the base station over a channel.

The initial channel quality information $I_0$, as illustrated in FIGS. 8 and 9, indicates a first channel quality of the channel. The channel quality of the channel is related to the information how good/bad the communication over the quality is, e.g., how good/bad a signal can be transmitted over the channel. For instance, a bad channel quality indicates that the signal is likely to be lost or damaged, and a good channel quality indicates that the signal is likely to be successfully transmitted.

The initial channel quality information $I_0$ is described, for example, by at least a transmission parameter, such as a modulation scheme and/or coding rate. For instance, a modulation and coding scheme (MCS) value, which depends on a large number of variables, may be used in order to allow transmission with an adequate margin for a reliable signal transmission. For efficiently determining the MCS value, the initial channel quality information may be an index value of a MCS table. The MCS index value table gives, for example, possible combinations of at least one of a number of spatial streams, a modulation scheme, and a coding rate. For example, the MCS index value is tabulated and shared between the UE and the base station. According to one implementation, for example with a configured grant for the uplink, the initial channel quality information $I_0$ is provided by the RRC layer. According to a further implementation, for example with a configured grant for the uplink or downlink, the initial channel quality information $I_0$ is provided by the L1/L2 signaling, for example the DCI PDCCH.

The signal is transmitted based on the initial channel quality information $I_0$ by applying the modulation scheme and coding rate corresponding to the initial channel quality information $I_0$ Thus, for example, the bit rate and robustness of data transmission for the signal may be matched to the channel quality.

Figure 11:
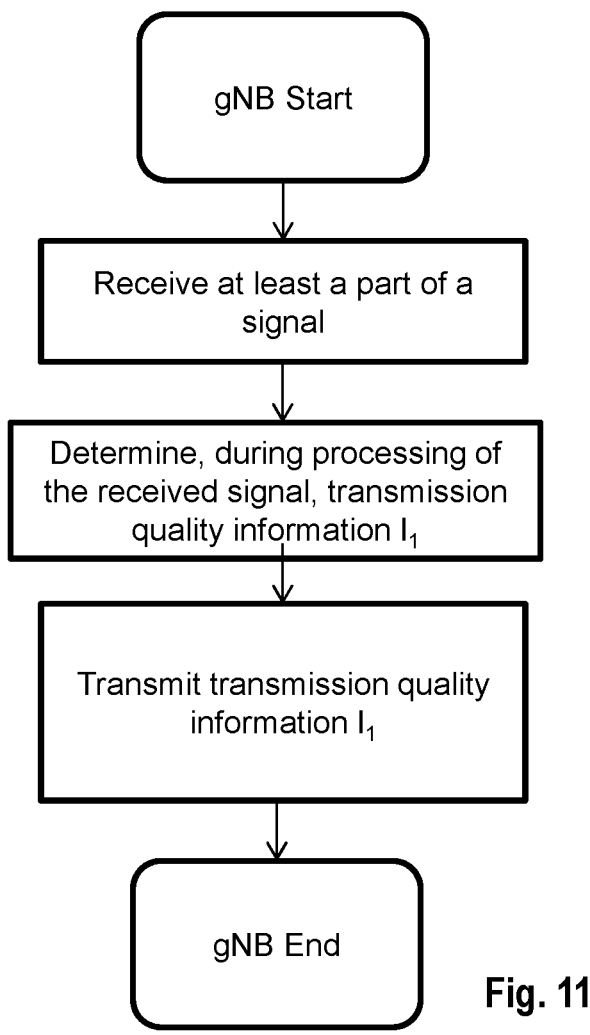
FIG. 11 is a flow diagram for the behavior of the base station, according to an exemplary implementation of an embodiment.

As further illustrated in FIG. 8 and FIG. 11, a flow diagram of the gNB behavior according to an exemplary implementation of the above principles is illustrated. The gNB receives at least a part of the signal. For example, the gNB determines a transmission quality information $I_1$, based on the received signal, for instance, based on at least one reference signal comprised in the transmitted signal.

Figure 12:
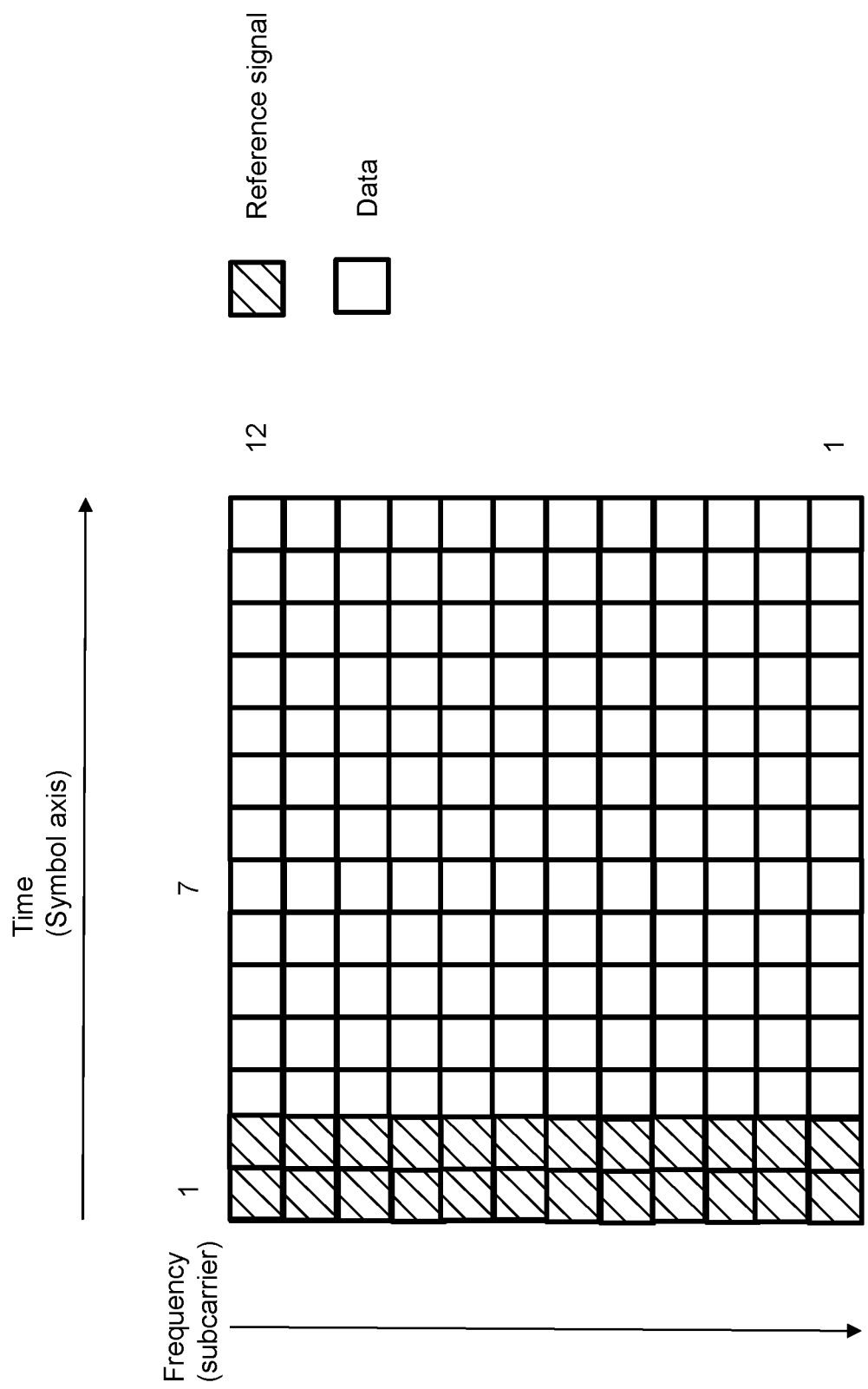
FIG. 12 is a schematic drawing of a front loaded reference signal configuration, according to an exemplary implementation.
Figure 13:
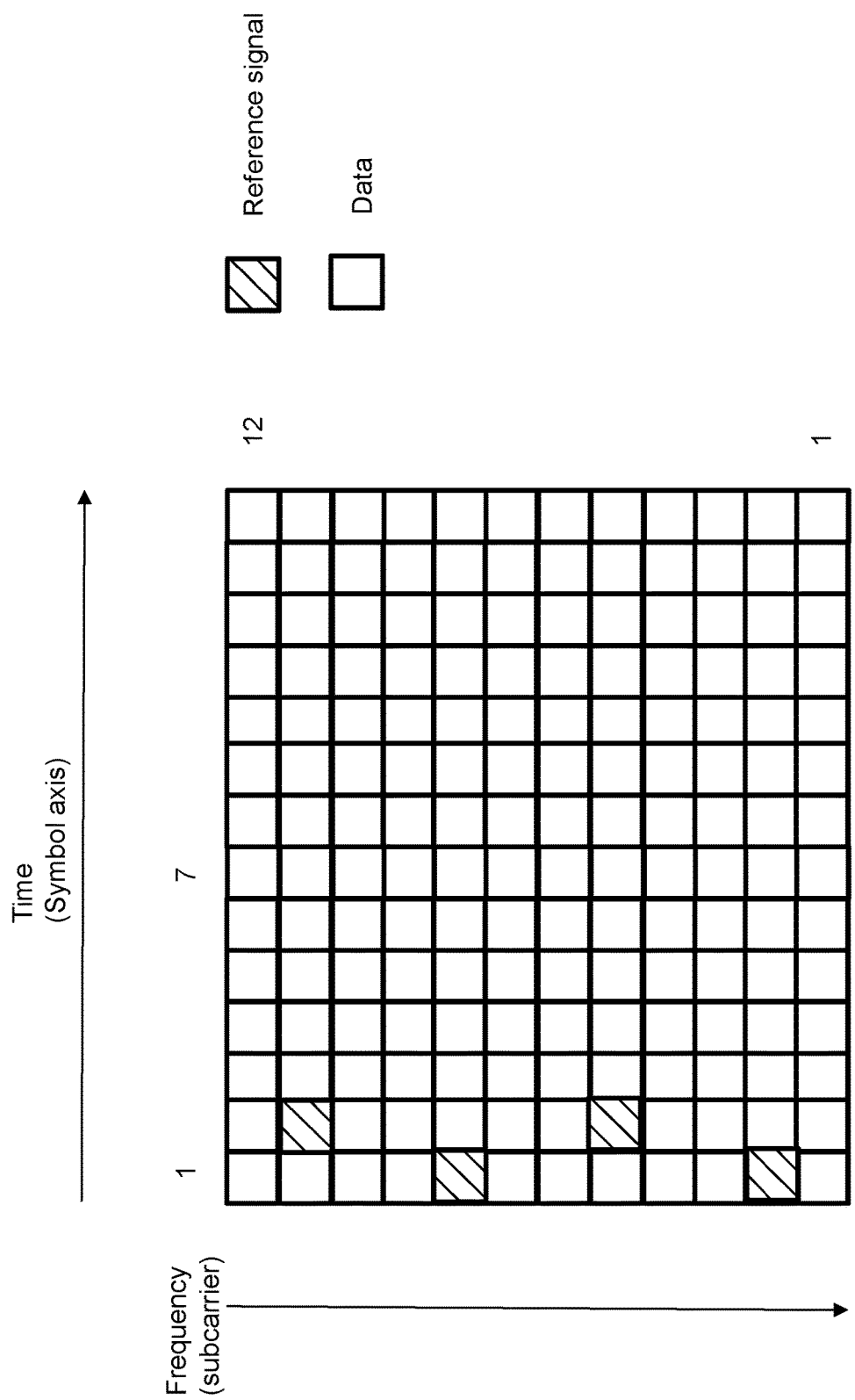
FIG. 13 is another schematic drawing of a front loaded reference signal configuration, according to another exemplary implementation.

FIGS. 12 and 13 illustrate examples of time-frequency grids comprising the signal. For example, the signal comprises reference signals (hatched elements) and data signals. Reference signals are predefined signals occupying specific resource elements within the time-frequency grid. The reference signals may be used for determining the transmission quality information $I_1$.

As will become apparent from the following, the reference signals may occupy different resource elements in the time-domain location. According to one implementation, the transmission quality information $I_1$ is determined as soon as possible after receiving only the reference signals and there is no need to wait for receiving further resource elements. According to another implementation, the gNB may receive the complete signal and only process the reference signal for determining the transmission quality information $I_1$.

As illustrated in the examples in FIGS. 12 and 13, the reference signals occupy front-loaded resource elements, namely occupying the time domain-location of symbols one and two. Although not illustrated, the reference signals may occupy the time domain-location of symbols other than one or two.

In other words, the reference signals may occupy the first N symbols of the transmitted signal, N being an integer greater or equal 1. For example, the front-loaded reference signal is comprised within the first N symbols of the signal. For example as shown in FIGS. 12 and 13, the front-loaded reference signal is comprised within the first two symbols of the transmitted signal, i.e., N=2.

Alternatively, the reference signals may occupy any front-loaded resource element. A front-loaded design of the reference signal allows the receiver to obtain an early channel estimation, which is beneficial for achieving a low latency.

According to one implementation, the reference signals are demodulation reference signals (DM-RS). Additionally or alternatively, according to a further implementation, front-loaded sounding reference signals (SRS) may be used for channel-state estimation. For example, a new SRS may be a front-loaded reference signal, for example occupying time domain-location of symbols one and/or two.

Additionally or alternatively, as for example shown in FIG. 13, the reference signals may occupy the first N symbols, wherein the remaining part of the first N symbols may comprise data.

As further illustrated in FIGS. 8 and 11, the gNB determines, upon receiving at least a part of the signal, a transmission quality information $I_1$. According to one implementation, the received part of the signal is less than the entire length of the received signal. Thus, a low latency can be achieved. Additionally or alternatively, the received part of the transmitted signal is the complete signal.

Further, the gNB determines the transmission quality information $I_1$, wherein the transmission quality information $I_1$ indicates a second channel quality of the channel used for transmitting the signal. For example, the gNB determines the transmission quality information $I_1$ based on the above discussed reference signals. The second channel quality may be different from the first channel quality. In other words, the signal, which for example comprises reference signals such as DMRS, is used to measure the channel quality of the channel during the transmission of the signal.

In other words, by determining the transmission quality information $I_1$, the most recent channel quality can be determined. Thus, possible deterioration of the channel quality may be determined during receiving the signal. Additionally, an early estimation whether the signal reception is successful or not is possible.

According to one exemplarily implementation, the transmission quality information $I_1$ describes the second channel quality in a similar way as the initial channel quality information $I_0$ describes the first channel quality. The transmission quality information $I_1$ is described, for example, by at least a transmission parameter, such as a modulation scheme and/or coding rate. For instance, a modulation and coding scheme (MCS) value, which depends on a large number of variables, may be used in order to allow transmission with an adequate margin for a reliable signal transmission. For efficiently determining the MCS value, the transmission quality information may be an index value of a MCS table. The MCS index value gives possible combinations of at least one of a number of spatial streams, a modulation scheme, and a coding rate. For example, the MCS index value is tabulated and shared between the UE and the base station.

Additionally or alternatively, the transmission quality information $I_1$ is described by a channel quality indicator (CQI). For example, the channel quality indicator may be mapped to a value of the MCS and/or an index value of the MCS.

As illustrated by FIG. 11, the transmission quality information $I_1$ is determined during processing of the received signal. For example, the gNB determines the transmission quality information $I_1$ before having completely processed the complete signal. In other words, before termination of processing the received signal, the gNB determines the transmission quality information $I_1$. Termination of processing may include, for example, determine if the signal have been successfully received or if a retransmission of at least a part of the signal is required. Additionally, the gNB may determine the transmission quality information $I_1$ before having received the complete signal. For example, the gNB may upon having received only N front-loaded reference symbols, N being an integer greater equal 1, determining the transmission quality information $I_1$.

As further illustrated in FIG. 8, 9, and FIG. 11, the transmission quality information $I_1$ is communicated from the gNB to the UE. For example, upon determining by the gNB the transmission quality information $I_1$ based on the complete signal, the gNB transmits the transmission quality information $I_1$ to the UE. Thus, the timing of transmitting the transmission quality information $I_1$ depends on the actual implementation on how the gNB determine the transmission quality information $I_1$.

For example, the transmission quality information $I_1$ may be transmitted immediately and as soon as possible after receiving a part of the signal comprising only reference signals (cf. FIG. 12) and only processing the reference signals. In other words, only front-loaded reference signals are received and processed for determining the transmission quality information $I_1$.

Alternatively, the transmission quality information $I_1$ may be transmitted immediately and as soon as possible after receiving only a part of the signal comprising reference signals and data signals (cf. FIG. 13) and only processing said part of the signal. In other words, only front-loaded signals are received and processed for determining the transmission quality information $I_1$.

Alternatively, the transmission quality information $I_1$ may be transmitted immediately and as soon as possible after receiving the complete signal. In other words, although the complete signal is received only the front-loaded signals may be processed for determining the transmission quality information $I_1$.

As further illustrated in FIG. 9, the transmission quality information $I_1$ is received by the UE. Upon receiving the transmission quality information $I_1$, which is related to the previously transmitted signal, the UE estimates the transmission quality of the previously transmitted signal based on the transmission quality information $I_1$ and the initial channel quality information $I_0$. For example, the transmission quality is estimated by comparing transmission quality information $I_1$ and the initial channel quality information $I_0$. In other words, the UE may compare values related to the first channel quality and the second channel quality. For instance, the UE may estimates that the channel quality has been too bad for a successful transmission of the signal. In other words, the first channel quality may be a predicted value for transmitting the signal over the channel, and the second channel quality may be a measured value determined upon communicating the signal over the channel. Consequently, based on the transmission quality information $I_1$, which indicates the second channel quality, assumptions and/or predictions may be made, whether the signal was successfully received by the gNB or not.

The initial channel quality information $I_0$ is indicating the first channel quality of the channel and the transmission quality information $I_1$ is indicating the second channel quality of same channel. According to one implementation, both, the initial channel quality information $I_0$ and transmission quality information $I_1$ may be a similar type, which can be easily compared. For example, both values may be an index value of the MCS.

Alternatively, the transmission quality information $I_1$ may be of a different type such as the channel quality information $I_0$. For example, the transmission quality information $I_1$ may be a CQI which is mapped to the same type of parameter as the initial channel quality information $I_0$, for example, an index value of the MCS.

As illustrated in FIG. 9 the UE whether the transmission of the signal over the channel was successful or not. For example, the transmission quality indicates how reliable the transmission of the signal over the channel was. Estimating the transmission quality may include, for example, determining a likelihood how reliable the transmission of the signal to the base station over the channel was. The estimation may comprise a comparison, which may include determining a difference of or a ratio between the initial channel quality information $I_0$ and the transmission quality information $I_1$.

The estimation of the success may be based, for example, on any mathematical operation. Operations may include binary operations such as determining a ratio or a difference. Additionally or alternatively, the transmission quality information $I_1$ may be folded with the initial channel quality information $I_0$. For example, the transmission quality may be a likelihood, based on which it is estimated how likely it is that signal transmission is successful or not. For example, the UE estimates the success of the transmission by determining whether the signal transmission was reliable enough or not.

According to one implementation, the UE estimates whether the transmission was successful or not by estimating the transmission quality using a threshold value. For example, the transmission quality is compared with a threshold value. The threshold value may be a predetermined or a determined value which is stored in the UE in advance. According to one implementation, the UE estimates a negative outcome for the transmission of the signal if the estimated transmission quality indicates that the signal transmission was not successful. According to one implementation, the UE estimates a positive outcome for the transmission of the signal if the estimated transmission quality indicates that the signal transmission was successful. In other words, by determining the outcome, a feedback (ACK/NACK) is estimated as to whether the signal was successfully transmitted or not.

Figure 10:
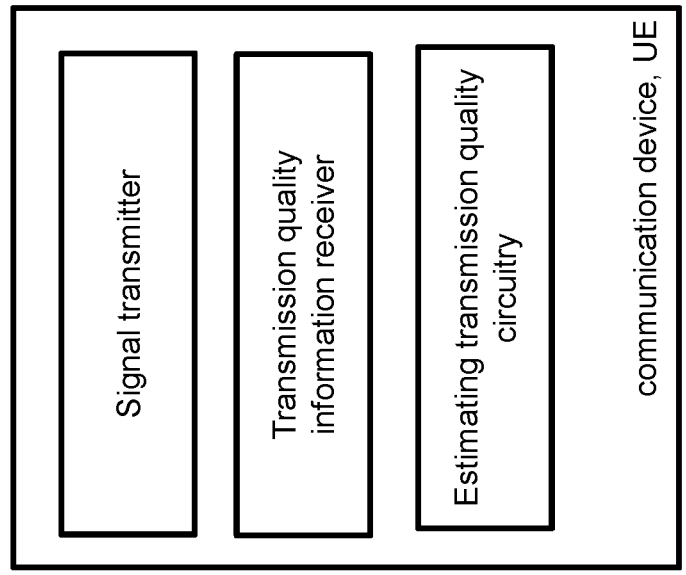
FIG. 10 illustrates a structure of the UE according to an exemplary implementation of an embodiment.

FIG. 10 illustrates a simplified and exemplary UE structure according to the above described solution. The various structural elements of the UE illustrated in FIG. 10 can be interconnected between one another, e.g., with corresponding input/output nodes (not shown) e.g., in order to exchange control and user data and other signals. Although not shown for illustration purposes, the UE may include further structural elements.

As apparent therefrom, the UE includes a signal transmitter which transmits signals based on the initial channel quality information. The UE further includes a transmission quality information receiver for receiving transmission quality information. The UE also comprises circuitry for estimation the transmission quality (estimating transmission quality circuitry in FIG. 10), based on initial channel quality information $I_0$ and the transmission quality information $I_1$ received by the transmission quality information receiver.

Figure 14:
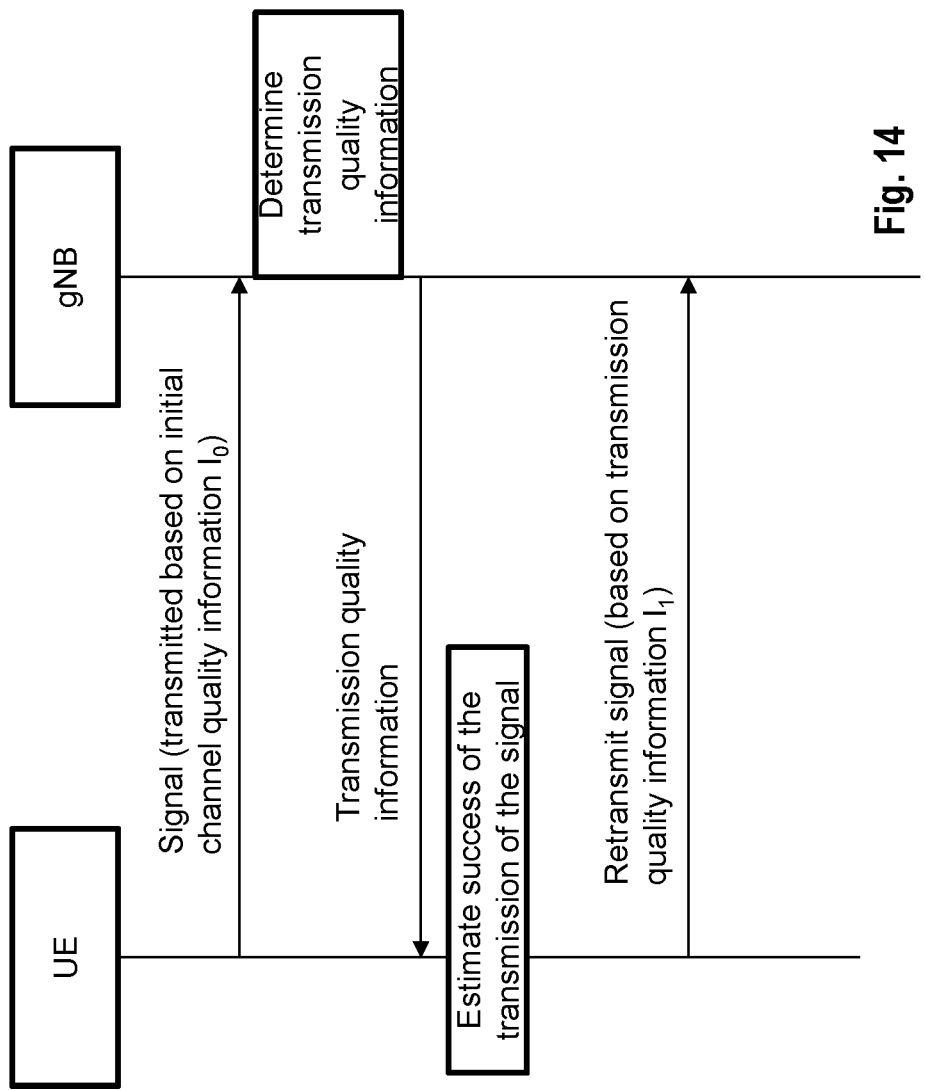
FIG. 14 illustrates another exemplary signal communication between the UE and the base station, according to another exemplary implementation.

One more detailed exemplary communication between the UE and the gNB according to the above-explained principles is illustrated in FIG. 14. FIG. 14 illustrates the communication between the UE and the gNB in a similar manner as FIG. 8. In the following, the new steps introduced in FIG. 14 will be described. For the remaining steps, it is referred to the above description of FIG. 8.

The implementation illustrated in FIG. 14 additionally comprises a retransmission step. As illustrated, the signal is communicated after estimating the transmission quality, namely by estimating the success of the transmission of the initial signal. Additionally or alternatively, as illustrated in FIG. 14, the UE may retransmit the signal upon estimation of the transmission quality.

According to one implementation, the signal retransmission is based on the transmission quality information $I_1$, i.e., the transmission parameters (such as modulation scheme and coding rate) can be chosen based on transmission quality information $I_1$. Alternatively, the signal retransmission may be based on the initial channel quality information $I_0$ i.e., the transmission parameters (such as modulation scheme and coding rate) can be chosen based on transmission quality information $I_0$.

Figure 15:
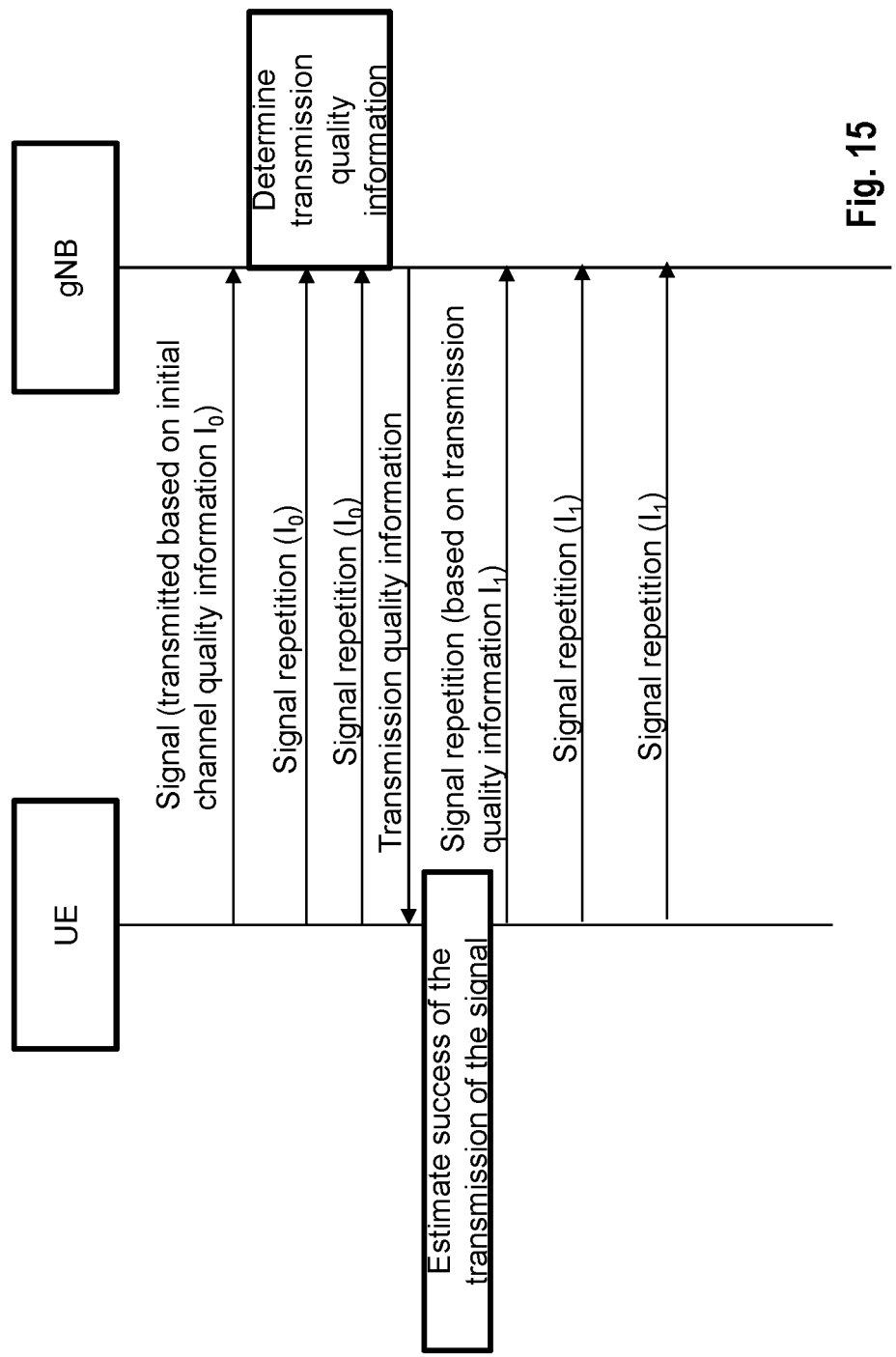
FIG. 15 illustrates another exemplary signal communication between the UE and the base station, according to another exemplary implementation.

Additionally or alternatively, as illustrated in FIG. 15, the UE may perform repetition of the signal. Repetitions may for instance be scheduled transmissions of the signal. As illustrated in FIG. 15, upon receiving the transmission quality information the UE may perform signal repetition based on the transmission quality information $I_1$. Additionally or alternatively, upon estimation of the transmission quality the UE may perform signal repetition based on the transmission quality information $I_1$. As described above for the signal retransmission, the signal repetition may be alternatively based on the initial channel quality information $I_0$. Unless differently provided, the exemplarily implementations or variations discussed for signal retransmission may be applicable also for repetitions of the signal. Signal retransmission may be based on at least a part of the signal.

According to one implementation, assuming that the signal shall be retransmitted using transmission parameters that are based on the transmission quality information $I_1$, the UE first may update the MCS value based on the transmission quality information $I_1$. For instance, the transmission quality information $I_1$ is an index value of the MCS and can be used by the UE to retransmit the signal. Additionally or alternatively, the MCS may be updated based on the transmission quality information $I_1$.

Figure 16:
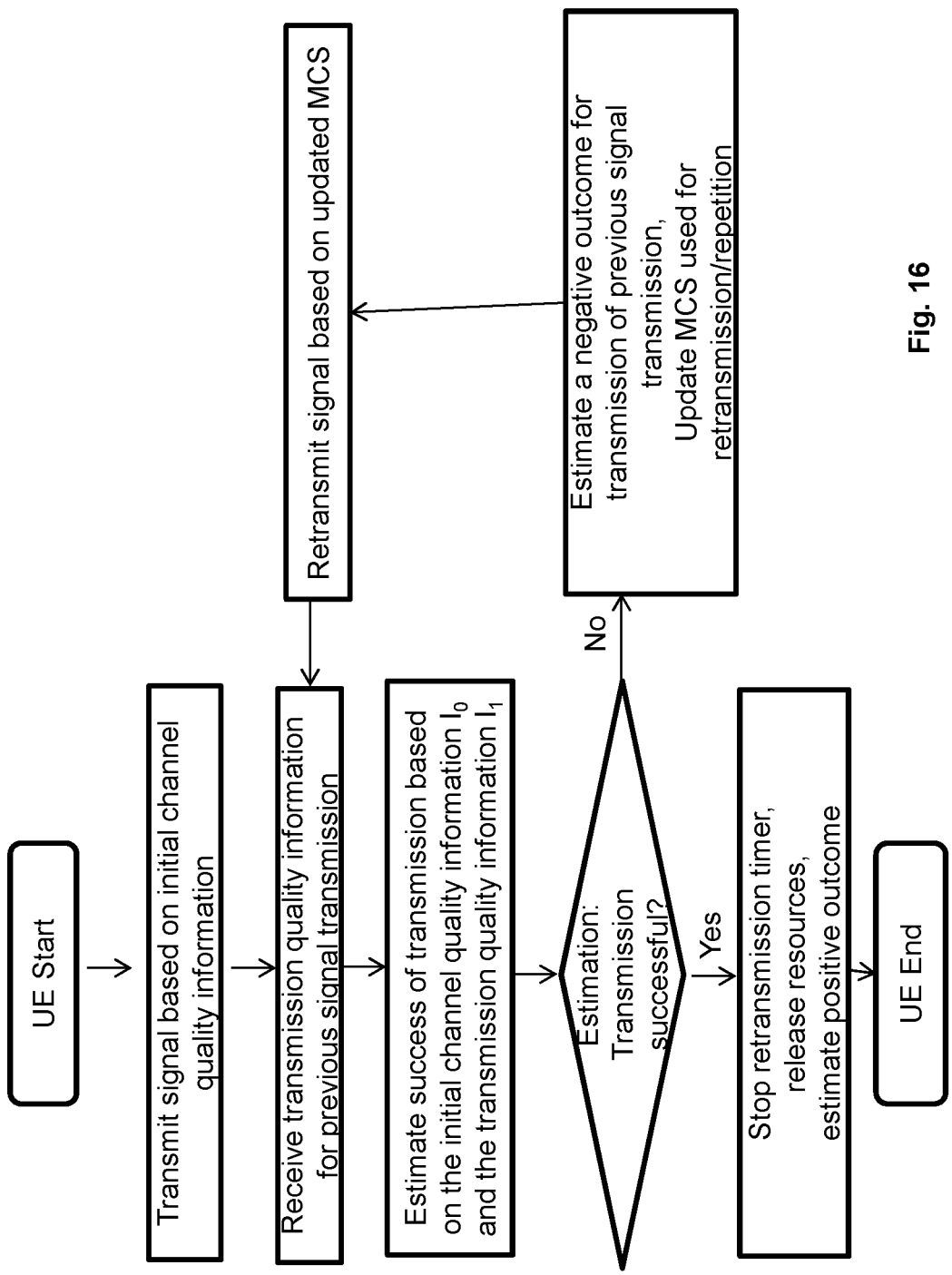
FIG. 16 is a flow diagram for the behavior of the UE, according to another exemplary implementation.

A further variation is illustrated in FIG. 16, which is a more detailed exemplary flow diagram of the UE behavior according an exemplary implementation. FIG. 16 illustrates the UE behavior in a similar manner as FIG. 9. In the following, the new steps introduced in FIG. 16 will be described. For the remaining steps, it is referred to the above description of FIG. 9.

In addition to the implementation discussed above with reference to FIG. 9, the exemplary scenario of FIG. 16 includes a decision step. The other steps of the FIG. 16 are similar to FIG. 9 and it is referred to the above description of FIG. 9. Based on the decision in the decision step, the UE may perform a retransmission for the signal, which may involve the retransmission of at least part of the signal.

Alternatively, the UE may, upon receiving the transmission quality information $I_1$, retransmit the signal based on the estimated transmission quality and/or the initial channel quality information. Then, the UE may estimate the transmission quality. This might beneficial in view of latency.

The decision of the decision step is based on the result of the estimation of the transmission quality. In particular, the estimation is based on the initial channel quality information and transmission quality information. Additionally or alternatively, the decision step may be based on the reliability of transmitting the signal. For example, if parameters influence the reliability, this may also influence whether a signal is successfully transmitted or not. For example, such an additional parameter may be considered in the decision step. For instance, the reliability of successfully receiving the signal may depend on the initial channel quality information used for transmitting the signal.

Alternatively, upon estimating the transmission quality, the UE may retransmit the signal based on the estimated transmission quality. For example, the UE retransmits the signal based on the initial channel quality or based on the transmission quality information.

In case of no at the decision step, as illustrated in FIG. 16, the UE may for example estimate that the outcome for the successful transmission of the previous signal is negative, and thus, an estimated negative feedback indicating that the signal transmission was not successful. Additionally or alternatively, the UE may for example update a MCS value for further retransmissions and/or repetitions of the signal as above described with reference to FIG. 14. For example, update the index value of the MCS, for signal retransmission and/or repetition.

In case of yes at the decision step, the UE may estimate that the outcome for the successful transmission of the previous signal is positive, and thus, positive feedback indicating that the signal transmission was successful.

Optionally, the UE may release resources. For instance, the UE may delete the signal and/or data, which may be related to the signal, from a storage, for example a retransmission buffer.

Optionally, the UE may stop a retransmission timer associated with the transmitted signal. According to a variant, the retransmission timer starts upon transmitting the signal based on the initial channel quality information (not illustrated in FIG. 16). While the retransmission timer is running, the UE may retransmit the signal. Stopping the retransmission timer may facilitate reducing the data traffic, because scheduled transmissions, e.g., repetitions, may be cancelled or aborted.

Figure 17:
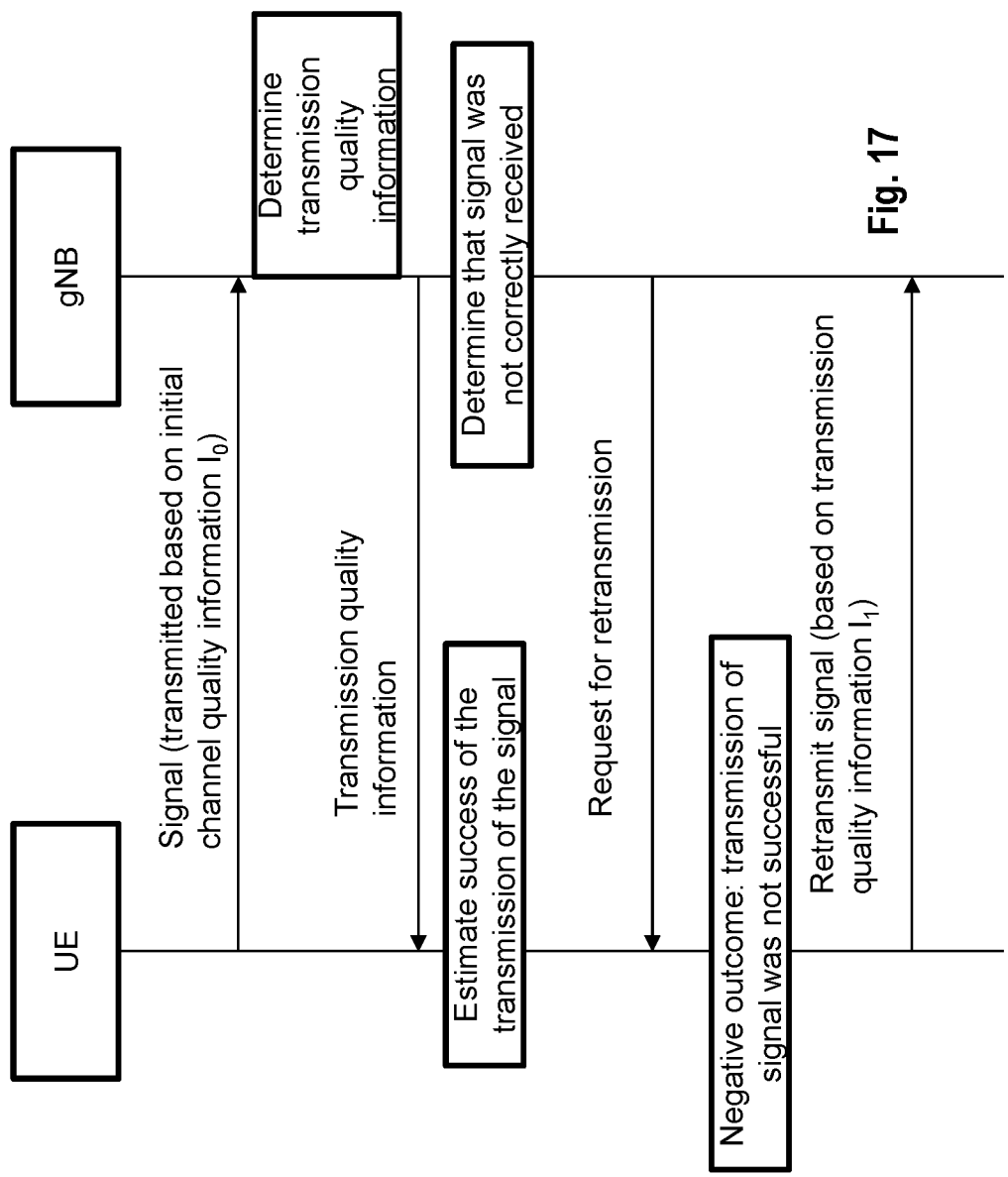
FIG. 17 illustrates another exemplary signal communication between the UE and the base station, according to another exemplary implementation.

One more detailed exemplary communication between the UE and the gNB according to the above-explained principles is illustrated in FIG. 17. FIG. 17 illustrates the communication between the UE and the gNB in a similar manner as FIG. 14. In the following, the new steps introduced in FIG. 17 will be described. For the remaining steps, it is referred to the above description of FIG. 14.

According to this implementation, the gNB transmits an explicit NACK (in the form of a request for retransmission) to the UE. It is assumed that the gNB determines that the signal was not correctly received and communicate the result of the determination the UE, for example, by requesting a retransmission for the signal.

Figure 18:
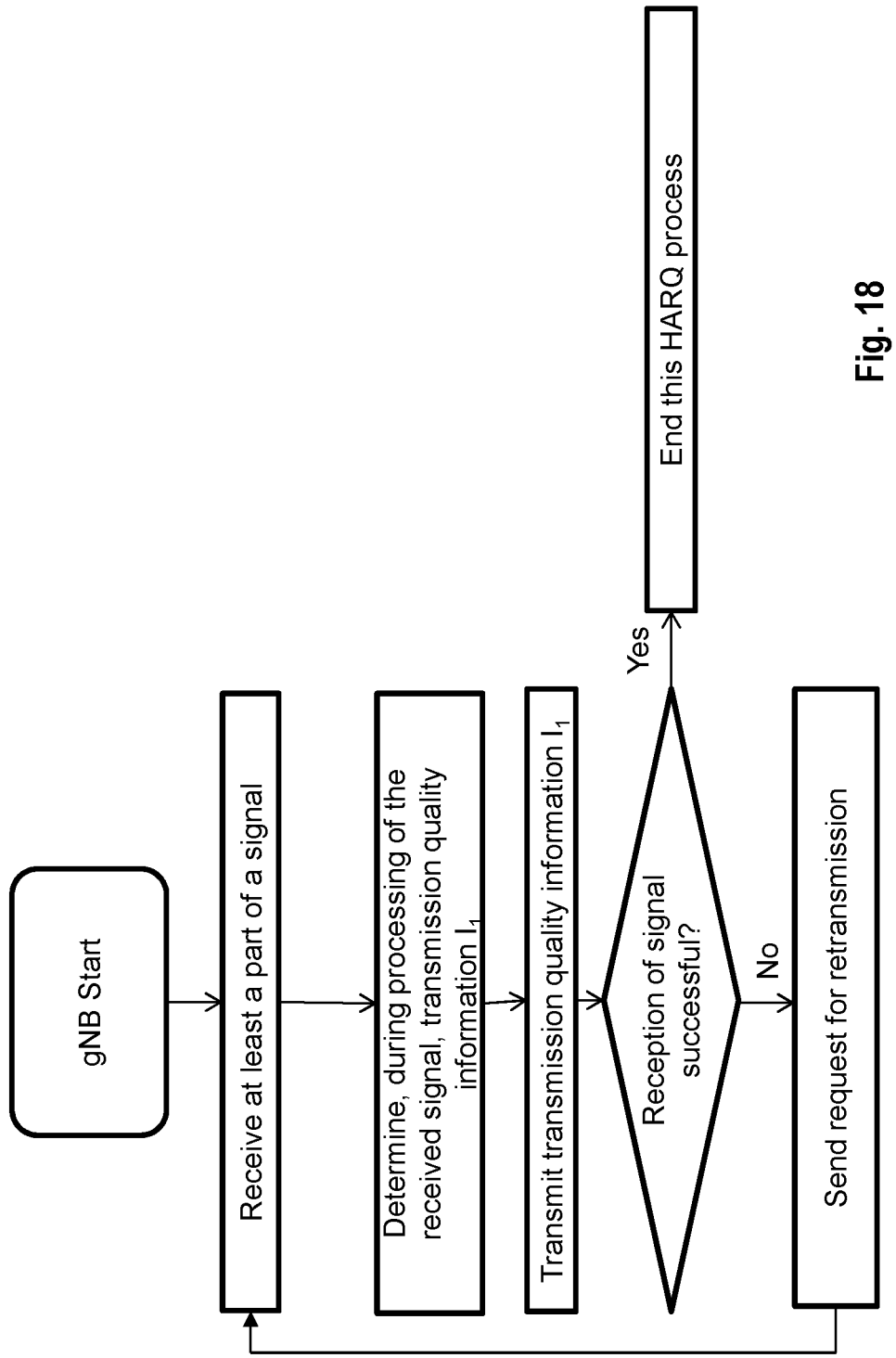
FIG. 18 is a flow diagram for the behavior of the base station, according to another exemplary implementation.

A further implementation for the gNB is illustrated in FIG. 18, which is a more detailed exemplary flow diagram of the gNB behavior. FIG. 18 illustrates the gNB behavior in a similar manner as FIG. 11. In the following, the new steps introduced in FIG. 18 are described. For the remaining steps, it is referred to the above description of FIG. 11.

According to this implementation, the gNB determines whether the reception of the signal was successful or not. For example, the gNB determines that at least a part of the signal is corrupted or cannot be successful received. Alternatively, the gNB determines that the reception of the signal was successful.

According to one implementation, the gNB determines whether the signal reception was successful or not after processing at least a part of the signal and/or after processing the complete signal.

Upon determining that a least a part of the signal is not successfully received, the gNB request a retransmission for at least a part of the signal. Such a process may be beneficial in view of latency.

According to another implementation, the gNB may delay transmitting the request for retransmission to the UE until a timer for retransmission has expiring. According to this implementation, the gNB may start the retransmission timer upon receiving at least a part of the signal from the UE. The timer may be a waiting timer. For instance, the duration of the timer may be configured by the RRC. For example, in case that the UE automatically retransmits the signal upon receiving the transmission quality information and/or the UE performs previously scheduled data retransmissions (e.g., data repetition), the gNB may automatically receive a retransmission of at least a part of the signal. Such a process may be beneficial in view of the data amount exchanged and latency.

According to one implementation, the request for retransmission may comprise a grant of radio resources for retransmission of the signal over the channel. In other words, a dynamic grant may be used. As an additionally exemplary element, the grant for retransmission may indicate a third channel quality information. Additionally or alternatively, the request for retransmission may be a control signaling, for example L1/L2 control signaling, for activation of a transmission without dynamic grant.

Upon determining, by the gNB, that the signal is successfully received, the gNB may the running HARQ process created for the data.

As further illustrated in the implementation of in FIG. 17, the UE receives the request for retransmission. Thus, the UE may for example determine a negative outcome for the transmission of the signal. In other words, the UE determines a negative feedback (NACK). Both, determined negative outcome and negative feedback may indicate that the previous signal transmission was not successful.

According to an implementation, the UE may retransmit the signal upon determining the negative outcome. This implementation facilitates that the UE may prepare the signal based on the estimated success of the signal transmission, i.e., the estimated outcome, which may be determined upon receiving the transmission quality information. Additionally, this implementation facilitates that the UE transmits the signal based on the transmission quality information, which might be advantageous in view of the recently measured channel quality, i.e., the second channel quality measured by the gNB using for example the front-loaded reference signals. Thus, when receiving the request for retransmission, the signal is already prepared for transmission, which is beneficial in view of latency. Additionally, retransmitting the signal only upon receiving the retransmission request reduces the data traffic.

Figure 19:
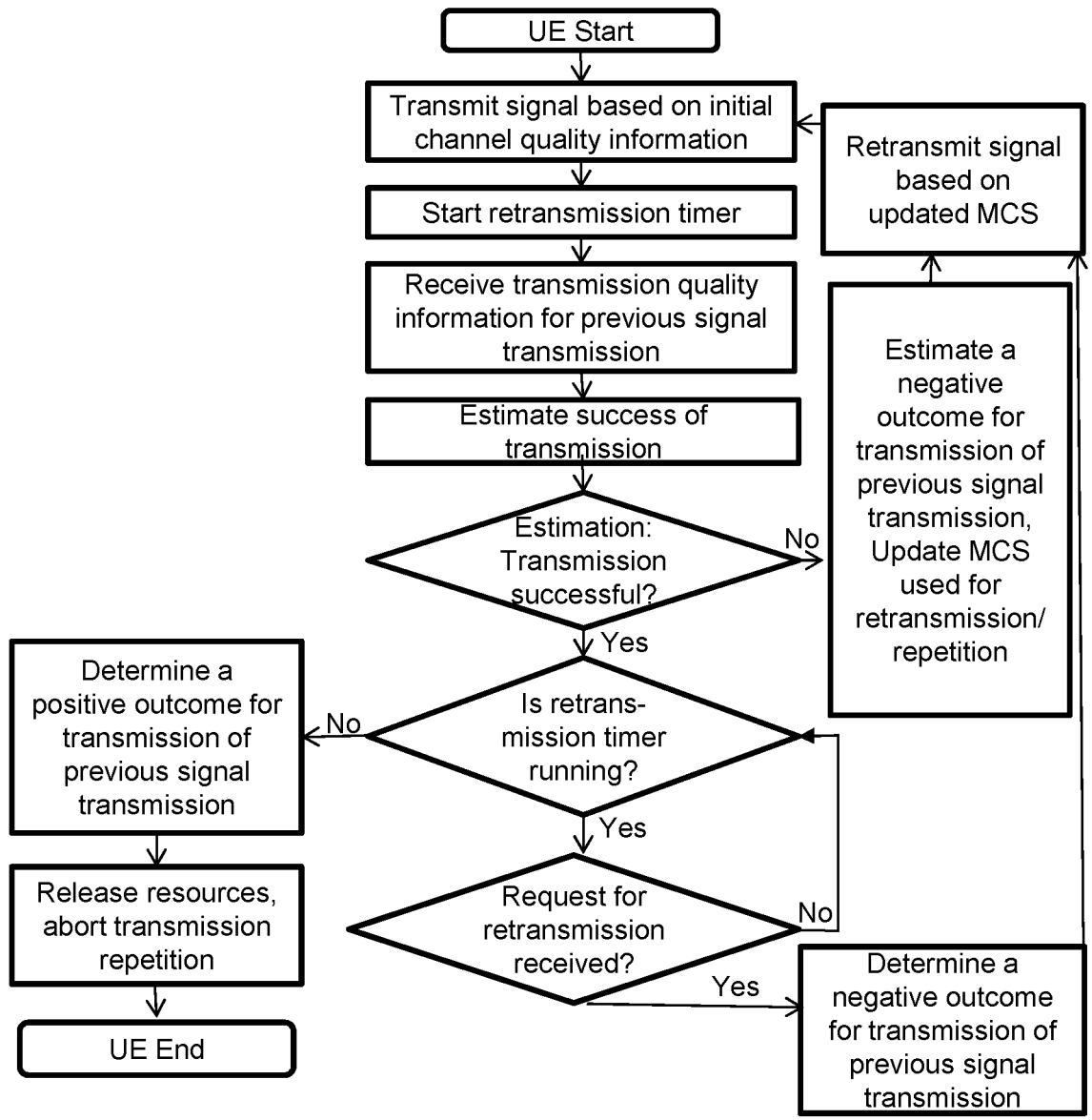
FIG. 19 illustrates another exemplary signal communication between the UE and the base station, according to another exemplary implementation.

This exemplary implementation with a request for retransmission is for example illustrated in FIG. 19, which is a more detailed exemplary flow diagram of the UE behavior according an exemplary implementation. FIG. 19 illustrates the UE behavior in a similar manner as FIG. 16. In the following, the new steps introduced in FIG. 19 will be described. For the remaining steps, it is referred to the above description of FIG. 16.

According to one implementation, the UE determines a negative outcome for the transmission of the previous signal upon receiving a request for retransmission (Yes after request for retransmission received). Similar to FIG. 16, the UE updates the MCS value used for repetition upon estimating that the transmission is not successful (No after estimation of successful transmission). For example, upon estimating the negative outcome, the UE may for example prepare the signal for retransmission. Upon receiving the request for retransmission, the UE may retransmit the signal. As described above, this may reduce the latency and additionally reduce the communicated amount of data. For further details, in particular how the UE updates the table, it is referred to the above description of FIG. 16.

According to one implementation, the UE starts a retransmission timer. As for example illustrated in FIG. 19, FIG. 20, and FIG. 21, the retransmission timer may be started for the transmission of the initial signal, i.e., the signal that is based on the initial channel quality. FIG. 20 and FIG. 21 illustrate the communication between the UE and the gNB for the implementation comprising a retransmission timer. FIG. 20 and FIG. 21 illustrate the communication between the UE and the gNB in a similar manner as FIG. 8. In the following, the new steps introduced in FIG. 20 and FIG. 21 will be described. For the remaining steps, it is referred to the above description of FIG. 8.

As illustrated in FIG. 20 and FIG. 21, the retransmission timer is started when the signal is transmitted from the UE to the gNB.

As illustrated in FIG. 20, while the transmission timer is running, the UE receives a transmission quality information from the gNB. However, while the timer is running the UE does not receive a request for retransmission, as for example illustrated in FIG. 17. Upon expiry of the timer, the UE thus may determine a positive outcome for the signal transmission. In other words, based on the expiry of the retransmission timer (in combination with the received transmission quality information) the UE determines a positive feedback indicating a success of the signal transmission.

As correspondingly illustrated in FIG. 19, the UE may for example check if the retransmission timer is expired or running. In case the retransmission timer is expired (retransmission timer is not running), the UE may determine a positive outcome for the transmission of the previous signal transmission. Optionally, the UE may release resources as already mentioned before.

In case that the retransmission timer is still running, the UE may monitor a downlink channel for receiving the above discussed request for retransmission.

As illustrated in FIG. 21, there may be cases where the UE may not receive at the transmission quality information or the request for retransmission while the retransmission timer is running. Two possible scenarios may cause this. According to a first scenario, the gNB does not receive the signal from the UE, and thus the gNB does not communicate the transmission quality information to the UE. According to a second scenario, the gNB receives the signal from the UE and transmits the transmission quality information, however the UE does not receive transmission quality information from the gNB. In both scenarios, the retransmission timer expires before the UE receives the transmission quality information. Upon expiry of the timer, the UE may determine a negative outcome for the signal transmission and the UE may retransmit the signal to the gNB. For example, the UE may retransmit the signal based on a new channel quality information $I_2$ using a modulation and coding scheme that increase the reliability that the signal is successfully received by the gNB.

Further Aspects

According to a first aspect, a user equipment is provided, which comprises a transmitter, which transmits a signal to a base station over a channel, wherein the signal is transmitted based on an initial channel quality information indicating a first channel quality of the channel. The UE comprises a receiver, which receives a transmission quality information indicating a second channel quality of the channel used for transmitting the signal. The UE comprises a processing circuitry, which estimates a transmission quality based on the initial channel quality information and the transmission quality information, wherein the transmission quality indicates whether the transmission of the signal over the channel was successful or not. According to a second aspect provided in addition to the first aspect, the transmission quality information is determined by the base station upon receiving at least a part of the transmitted signal. In one optional implementation, the received part of the transmitted signal is less than the complete signal.

According to a third aspect provided in addition to the first or second aspect, the transmission quality information is determined by the base station based on a reference signal. In one optional implementation, the reference signal is a front-loaded reference signal comprised within the first N symbols of the transmitted signal, N being an integer greater or equal 1. In one optional implementation, the first N symbols of the transmitted signal comprises at least one front-loaded reference signal and at least one data signal. In one optional implementation, the first N symbols of the transmitted signal comprises only front-loaded reference signals. In one optional implementation, the transmission quality information is determined by the base station based on only a part of the transmitted signal. In one optional implementation, the transmission quality information is determined by the base station based on only at least one front-loaded reference signal.

According to a fourth aspect provided in addition to any of first to third aspects, the processing circuitry, when in operation, uses the transmission quality for estimating whether the transmission was successful or not based on a threshold value. In one optional implementation, the processing circuitry, when in operation, determines a negative outcome for the transmission of the signal, if the estimated transmission quality indicates that the signal transmission was not successful. In one optional implementation, the processing circuitry, when in operation, determines a positive outcome for the transmission of the signal, if the estimated transmission quality indicates that the signal transmission was successful.

According to a fifth aspect provided in addition to any of first to fourth aspects the processing circuitry estimates that the transmission of the signal over the channel was not successful, the transmitter, when in operation, performs signal transmission based on the transmission quality information. In one optional implementation, the transmitter, when in operation, performs retransmission of the signal upon receiving the transmission quality information. In one optional implementation, the transmitter, when in operation, performs repetition of the signal upon receiving of the transmission quality information.

According to a sixth aspect provided in addition to any of first to fifth aspects the processing circuitry, when in operation, determines that the transmission of the signal was not successful if the receiver, when in operation, receives a retransmission request for retransmitting at least a part of the signal. In one optional implementation, the processing circuitry, when in operation, determines that the transmission of the signal was successful upon expiry of a retransmission timer associated with the transmitted signal. In one optional implementation, the processing circuitry, when in operation, starts the retransmission timer upon transmitting the signal to the base station.

According to a seventh aspect provided in addition to any of first to sixth aspects the receiver, when in operation, receives a grant for retransmission of the signal over the channel. In one optional implementation, the transmitter, when in operation, performs retransmission of the signal upon receiving the grant. In one optional implementation, the grant for retransmission indicates a third channel quality information. In one optional implementation, the transmitter, when in operation, performs retransmission of the signal upon receiving the third channel quality information.

According to an eighth aspect provided in addition to any of first to fourth aspects the receiver in case that the processing circuitry estimates that the transmission of the signal over the channel was successful, the processing circuitry, when in operation, deletes the signal from a transmission buffer of the user equipment.

Additionally or alternatively, the processing circuitry, when in operation, aborts transmission repetition of the signal. In one optional implementation, the processing circuitry, when in operation stops a retransmission timer associated with the transmitted signal.

According to an ninth aspect provided in addition to any of first to eighth aspects the initial channel quality information indicates at least a transmission parameter, such as a modulation scheme, and/or a code rate. In one optional implementation, wherein the initial channel quality information is an index of a modulation and coding scheme, MCS. In one optional implementation, the transmission quality information indicates at least a transmission parameter, such as a modulation scheme, a code rate, an index of a MCS, and/or a channel quality indicator. In one optional implementation, the processing circuitry, when in operation, determines an index of the MCS form the channel quality indicator.

According to a tenth aspect, a serving base station is provided. A receiver of the serving base station receives at least a part of a signal from a user equipment over a channel, wherein the signal is transmitted based on an initial channel quality information indicating a first channel quality of the channel. A processing circuitry of the serving base station determines during processing the received signal a transmission quality information indicating a second channel quality of the channel used for receiving the signal. A transmitter of the serving base station transmits the transmission quality information upon determining the transmission quality information.

According to an eleventh aspect provided in addition to the tenth aspect, the serving base determines the transmission quality information based on a reference signal. In one optional implementation, the reference signal is a front-loaded reference signal comprised within the first N symbols of the received signal, N being an integer greater or equal 1. In one optional implementation, the first N symbols of the transmitted signal comprises at least one front-loaded reference signal and at least one data signal. In one optional implementation, the first N symbols of the transmitted signal comprises only front-loaded reference signals. In one optional implementation, the transmission quality information is determined based on only a part of the received signal. In one optional implementation, the transmission quality information is determined by only at least one front-loaded reference signal.

According to a twelfth aspect provided in addition to the tenth or eleventh aspect, the serving base station monitors, upon expiry of a retransmission timer, the channel for retransmission or repetition of the signal. In one optional implementation, the processing circuitry, when in operation, starts the retransmission timer upon receiving at least a part of the signal.

According to a thirteenth aspect provided in addition to any of the tenth to twelfth aspects, the serving base station determines after processing the received signal whether the reception of the signal over the channel was successful or not. In one optional implementation, in case the procession circuitry determines that the reception of the signal was not successful, controls the transmitter to transmit a retransmission request for at least a part of the signal.

According to a fourteenth aspect, a method is provided comprising the following steps performed by a user equipment. A signal is transmitted to a base station over a channel, wherein the signal is transmitted based on an initial channel quality information indicating a first channel quality of the channel. A transmission quality information indicating a second channel quality of the channel used for transmitting the signal is received. A transmission quality is estimated based on the initial channel quality information and the transmission quality information, wherein the transmission quality indicates whether the transmission of the signal over the channel was successful or not.

According to a fifteenth aspect, a method is provided comprising the following steps performed by a base station. At least a part of a signal is received from a user equipment over a channel, wherein the signal is transmitted based on an initial channel quality information indicating a first channel quality of the channel. A transmission quality information indicating a second channel quality of the channel used for receiving the signal is determined during processing the received signal. The transmission quality information is transmitted upon determining the transmission quality information.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment, comprising:
a transmitter, which in operation, transmits a signal to a base station over a channel, wherein the signal is transmitted based on an initial channel quality information indicating a first channel quality of the channel and obtained by the user equipment before transmitting the signal;
a receiver, which in operation, receives, after transmitting the signal, a transmission quality information that is not an acknowledgement (ACK) or a non-acknowledgement (NACK) and that indicates a second channel quality of the channel used for transmitting the signal; and
a processing circuitry, which in operation,
estimates a transmission quality based on the initial channel quality information and the transmission quality information;
compares the transmission quality to a threshold; and
determines that the transmission of the signal over the channel was successful in response to the transmission quality exceeding the threshold.

2. The user equipment according to claim 1, wherein the transmission quality information is determined by the base station upon receiving at least a part of the transmitted signal.

3. The user equipment according to claim 1, wherein the transmission quality information is determined by the base station based on a reference signal.

4. The user equipment according to claim 1, wherein after the processing circuitry estimates that the transmission of the signal over the channel was not successful,
the transmitter, in operation, performs signal transmission based on the transmission quality information.

5. The user equipment according to claim 1, wherein the processing circuitry, in operation, determines that the transmission of the signal was not successful if the receiver, in operation, receives a retransmission request for retransmitting at least a part of the signal.

6. The user equipment according to claim 1, wherein the receiver, in operation, receives a grant for retransmission of the signal over the channel.

7. The user equipment according to claim 1, wherein in case that the processing circuitry estimates that the transmission of the signal over the channel was successful,
the processing circuitry, in operation, deletes the signal from a transmission buffer of the user equipment; or
the processing circuitry, in operation, aborts transmission repetition of the signal.

8. The user equipment according to claim 1, wherein the initial channel quality information indicates at least a transmission parameter including a modulation scheme or a code rate.

9. A base station, comprising:
a receiver, which in operation, receives at least a part of a signal from a user equipment over a channel, wherein the signal is transmitted based on an initial channel quality information obtained by the user equipment before transmitting the signal and indicating a first channel quality of the channel;
a processing circuitry, which in operation, determines during processing the received signal a transmission quality information that is not an acknowledgement (ACK) or a non-acknowledgement (NACK) and that indicates a second channel quality of the channel used for receiving the signal; and
a transmitter, which in operation, transmits the transmission quality information upon determining the transmission quality information, wherein the user equipment estimates a transmission quality based on the initial channel quality information and the transmission quality information, compares the transmission quality to a threshold and determines that the transmission of the signal over the channel was successful in response to the transmission quality exceeding the threshold.

10. The base station according to claim 9, wherein the processing circuitry, in operation, determines the transmission quality information based on a reference signal.

11. The base station according to claim 9, wherein the receiver, in operation, monitors, upon expiry of a retransmission timer, the channel for retransmission or repetition of the signal.

12. The base station according to claim 9, wherein the processing circuitry, in operation, determines after processing the received signal whether the reception of the signal over the channel was successful or not.

13. A method performed by a user equipment, comprising:
transmitting a signal to a base station over a channel, wherein the signal is transmitted based on an initial channel quality information indicating a first channel quality of the channel and obtained by the user equipment before transmitting the signal;
receiving, after transmitting the signal, a transmission quality information that is not an acknowledgement (ACK) or a non-acknowledgement (NACK) and that indicates a second channel quality of the channel used for transmitting the signal;
estimating a transmission quality based on the initial channel quality information and the transmission quality information;
comparing the transmission quality to a threshold; and
determining that the transmission of the signal over the channel was successful in response to the transmission quality exceeding the threshold.

* * * * *